United States Patent
Fujita et al.

(10) Patent No.: US 8,164,933 B2
(45) Date of Patent: Apr. 24, 2012

(54) POWER SOURCE CIRCUIT

(75) Inventors: Masashi Fujita, Tokyo (JP); Kiyoshi Kato, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 189 days.

(21) Appl. No.: 12/051,473

(22) Filed: Mar. 19, 2008

(65) Prior Publication Data
US 2008/0247208 A1 Oct. 9, 2008

(30) Foreign Application Priority Data

Apr. 4, 2007 (JP) ................. 2007-097991

(51) Int. Cl.
H02M 7/217 (2006.01)
(52) U.S. Cl. ........................................ 363/127
(58) Field of Classification Search .......... 363/81, 363/84, 127; 327/535, 537–541, 543
See application file for complete search history.

(56) References Cited

U.S. PATENT DOCUMENTS

| | | | |
|---|---|---|---|
| 5,461,338 A | 10/1995 | Hirayama et al. | |
| 5,736,728 A * | 4/1998 | Matsubara | 235/492 |
| 6,342,717 B1 | 1/2002 | Komatsu | |
| 6,372,558 B1 * | 4/2002 | Yamanaka et al. | 438/149 |
| 6,462,723 B1 | 10/2002 | Yamazaki et al. | |
| 6,603,453 B2 | 8/2003 | Yamazaki et al. | |
| 6,813,166 B1 * | 11/2004 | Chang et al. | 363/21.14 |
| 6,960,787 B2 | 11/2005 | Yamazaki et al. | |
| 7,247,882 B2 | 7/2007 | Yamazaki et al. | |
| 7,307,317 B2 * | 12/2007 | Koyama | 257/347 |
| 7,397,282 B2 * | 7/2008 | Mizuno et al. | 326/81 |
| 7,487,373 B2 * | 2/2009 | Koyama | 713/323 |
| 7,551,019 B2 * | 6/2009 | Fujita et al. | 327/537 |
| 2001/0038308 A1 | 11/2001 | Hiratsuka | |
| 2002/0190754 A1 * | 12/2002 | Brunolli | 326/83 |
| 2003/0164688 A1 * | 9/2003 | Park | 315/276 |
| 2004/0207011 A1 | 10/2004 | Iwata et al. | |
| 2005/0134173 A1 * | 6/2005 | Tsutsui et al. | 313/506 |
| 2005/0277241 A1 * | 12/2005 | Watanabe et al. | 438/200 |
| 2005/0280509 A1 | 12/2005 | Tanaka et al. | |
| 2005/0282505 A1 * | 12/2005 | Umeda et al. | 455/100 |
| 2006/0256597 A1 * | 11/2006 | Librizzi et al. | 363/125 |
| 2007/0003070 A1 * | 1/2007 | Hayashita | 381/56 |
| 2007/0029977 A1 * | 2/2007 | Asada | 322/24 |
| 2007/0187684 A1 | 8/2007 | Koyama | |

FOREIGN PATENT DOCUMENTS

| | | |
|---|---|---|
| EP | 1 607 764 A1 | 12/2005 |
| JP | 2002-41160 | 2/2002 |
| JP | 2006-5651 | 1/2006 |
| WO | WO 2005/074030 A1 | 8/2005 |

* cited by examiner

Primary Examiner — Adolf Berhane
Assistant Examiner — Jeffrey Gblende
(74) Attorney, Agent, or Firm — Husch Blackwell LLP

(57) ABSTRACT

A semiconductor device is provided, which comprises a rectifier circuit configured to generate a first voltage from a first signal inputted from an input terminal, a comparing circuit configured to compare a reference voltage and the first voltage inputted from the rectifier circuit and to output a second signal to a switch, and a voltage generation circuit configured to generate a second voltage from the first signal inputted from the input terminal. The rectifier circuit includes a transistor including at least a control terminal, and the voltage generation circuit inputs the second voltage to the control terminal when the switch is turned on in accordance with the second signal.

21 Claims, 15 Drawing Sheets

POWER SOURCE CIRCUIT

BACKGROUND OF THE INVENTION

1. Field of the Invention

The present invention relates to semiconductor devices.

2. Description of the Related Art

In recent years, identification technology in which an ID (identification number) is assigned to an individual object to clarify the history of information thereof, which is utilized for production, management, or the like has attracted attention. In particular, an RFID (radio frequency identification) such as an RF tag (also referred to as an ID tag, an IC tag, an IC chip, a wireless tag, or an electronic tag) which is a semiconductor device capable of communicating data wirelessly with a wireless communication device (which can transmit and receive a signal wirelessly, such as a reader/writer, a mobile phone, or a personal computer) (hereinafter referred to as a semiconductor device) has been introduced on a trial basis to markets, and the like and anticipated to be applied to various fields. Semiconductor devices include a passive semiconductor device which does not have a power source and receives power externally and an active semiconductor device which incorporates a power source.

Being capable of communicating data wirelessly with a wireless communication device, a semiconductor device can communicate even in a case where the distance from the wireless communication device is long. The distance over which communication is possible is referred to as communication distance. Communication distance of a passive semiconductor device which does not have a power source is greatly affected by performance of a rectification function of a transmitting and receiving circuit and varies in accordance with conversion efficiency at the time of generation of a DC voltage from received power. Communication distance of an active semiconductor device which incorporates a power source affects efficiency (time) in charging the power source. Therefore, research and development for improving supply efficiency of power from a wireless communication device to a semiconductor device have been actively carried out in order to extend communication distance between the wireless communication device and the semiconductor device (for example, Patent Document 1: Japanese Published Patent Application No. 2006-5651).

SUMMARY OF THE INVENTION

In wireless communication, however, when signals from a plurality of semiconductor devices are simultaneously read by a wireless communication device, distances between the wireless communication device and the plurality of semiconductor devices may differ. Further, there may be a case where communication distance varies from one minute to the next until a semiconductor device passes in front of a wireless communication device like when products to each of which a semiconductor device is attached is packed in a carton and carried on a forklift. In general, power attenuates in proportion to the square of the distance between a point from which power is radiated and a point at which power is measured. That is, power to be supplied from a wireless communication device to a semiconductor device varies depending on communication distance. Therefore, in a case where communication over a certain communication distance is possible, when a signal is received over an extremely short distance; for example, a wireless communication device and a semiconductor device come into contact with each other, if a high frequency signal is supplied to the semiconductor device, a large amount of current flows therethrough. In that case, the semiconductor device cannot correctly demodulate the signal from the wireless communication device and malfunctions; thus, an internal element of the semiconductor device deteriorates. At worst, the semiconductor device itself may be broken.

In view of the above problems, an object of the present invention is to provide a highly reliable semiconductor device which normally operates even when it receives a high frequency signal strong enough to break an element.

Note that a semiconductor device of the present invention includes anything as long as it can communicate data through wireless communication, such as an IC tag, a wireless tag, and an electronic tag.

The present invention employs the following structure to solve the above problems.

One mode of the present invention is a semiconductor device including a rectifier circuit, a comparing circuit for comparing an output of the rectifier circuit and a reference voltage, and a control circuit for controlling an output voltage of the rectifier circuit in accordance with a comparison result in the comparing circuit.

More specifically, the one mode of the present invention is a semiconductor device including a signal input terminal (also referred to as an input terminal); a rectifier circuit which is connected to the signal input terminal and generates a first DC voltage from a signal inputted from the signal input terminal; a comparing portion which is connected to the rectifier circuit and compares a reference signal and the first DC voltage inputted from the rectifier circuit; a substrate voltage generation portion which includes a switch connected to the comparing portion and a substrate voltage generation circuit connected to the rectifier circuit and connected to the signal input terminal through the switch, and which generates a second DC voltage from a signal inputted from the signal input terminal through the switch when the switch is turned on in accordance with a comparison result in the comparing portion. The rectifier circuit includes a transistor including at least a gate terminal, a source terminal, a drain terminal, and a substrate terminal (also referred to as a second gate terminal or a control terminal), in which the gate terminal is connected to one of the source terminal and the drain terminal and the substrate terminal is connected to the substrate voltage generation circuit; and a capacitor electrically connected to one of the source terminal and the drain terminal of the transistor. The transistor controls the value of a substrate voltage when the second DC voltage is applied through the substrate terminal.

Note that the semiconductor device in accordance with the one mode of the present invention may include a bias circuit which is connected to the comparing portion, generates a reference voltage, and outputs the reference voltage to the comparing portion.

Another mode of the present invention is a semiconductor device including a signal input terminal; a rectifier circuit which is connected to the signal input terminal and generates a first DC voltage from a signal inputted from the signal input terminal; a comparing portion which is connected to the rectifier circuit and compares a reference signal and the first DC voltage inputted from the rectifier circuit; a substrate voltage generation portion which includes a first switch connected to the comparing portion and a substrate voltage generation circuit connected to the rectifier circuit and connected to the signal input terminal through the first switch, and which generates a second DC voltage from a signal inputted from the signal input terminal through the first switch when the first switch is turned on in accordance with a comparison result in the comparing portion; a second switch which is connected to the comparing portion; and a bias circuit which is connected to the second switch. The rectifier circuit includes a transistor including at least a gate terminal, a source terminal, a drain terminal, and a substrate terminal, in which the gate terminal is connected to one of the source terminal and the drain terminal and the substrate terminal is connected to the substrate voltage generation circuit; and a capacitor electrically connected to one of the source terminal and the drain terminal of the transistor. The second switch is connected to the other of the source terminal and the drain terminal of the transistor. The bias circuit is connected to the substrate terminal of the transistor, is connected to the other of the source terminal and the drain terminal of the transistor through the second switch, and generates a third DC voltage from a signal inputted from the rectifier circuit through the second switch when the second switch is turned on in accordance with a comparison result in the comparing portion. The transistor controls the value of a substrate voltage when the first DC voltage or the second DC voltage is applied through the substrate terminal.

Note that the semiconductor device in accordance with the another mode of the present invention may include a second bias circuit which is connected to the comparing portion, generates a reference voltage, and outputs the reference voltage to the comparing portion.

Note that the semiconductor device in accordance with the present invention may include an antenna which is connected to the signal input terminal and transmits and receives a signal.

Further, in the present invention, the transistor may include a single crystal semiconductor layer.

Further, in the present invention, a half-wave voltage doubler rectifier circuit may be used as the rectifier circuit. A half-wave voltage doubler rectifier circuit generates a voltage higher than that of the inputted signal by subjecting an inputted signal to voltage doubler rectification.

Note that when A and B are explicitly described as "being electrically connected", the following cases are included: a case where A and B are electrically connected, a case where A and B are functionally connected, and a case where A and B are directly connected. Here, each of A and B is an object (for example, a device, an element, a circuit, a wiring, an electrode, a terminal, a conductive film, or a layer). Therefore, the present invention may include connections other than a predetermined connection shown or described in the specification.

Note that the transistor in this document (description, drawings, or the like) includes at least a gate terminal, a source terminal, and a drain terminal, and the gate terminal refers to part of a gate electrode (including a region which functions as a gate, a conductive layer, a wiring, and the like) or part of a portion which is electrically connected to the gate electrode. The source terminal refers to part of a source electrode (including a region which functions as a source, a conductive layer, a wiring, and the like) or part of a portion which is electrically connected to the source electrode. The drain terminal refers to part of a drain electrode (including a region which functions as a drain, a conductive layer, a wiring, and the like) or part of a portion which is electrically connected to the drain electrode.

Since the source terminal and the drain terminal of the transistor in this document (description, drawings, or the like) are changed depending on the structure, the operating conditions, or the like of the transistor, it is difficult to define which is a source terminal and which is a drain terminal. Therefore, in this document (description, drawings, or the like), one terminal which is arbitrarily selected from a source terminal and a drain terminal is called one of the source terminal and the drain terminal, whereas the other terminal is called the other of the source terminal and the drain terminal.

The capacitor in this document (description, drawings, or the like) includes at least two electrodes, that is, one electrode and the other electrode. Part or entire of one electrode is called a first terminal, whereas part or entire of the other electrode is called a second terminal.

The present invention can provide a semiconductor device to which an excess voltage is not applied even when a signal strong enough to break an element in the semiconductor device is supplied.

DETAILED DESCRIPTION OF THE INVENTION

Figure 1:
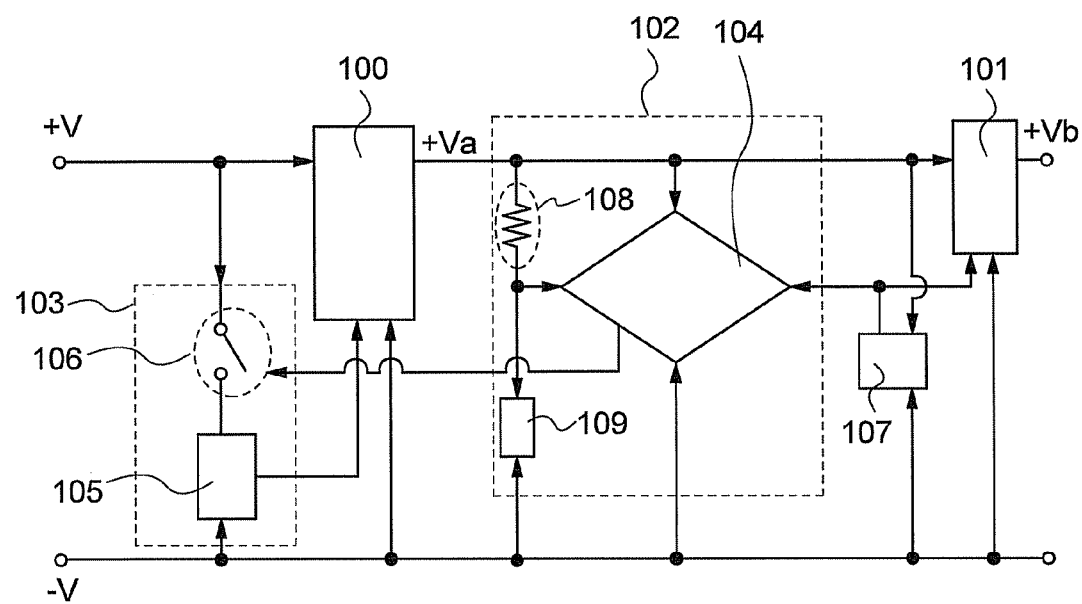
FIG. 1 is a block diagram showing a power source portion of the present invention.

Although embodiment modes of the present invention will be described with reference to the accompanying drawings, it is to be easily understood by those skilled in the art that various changes and modifications can be made without departing from the spirit and scope of the present invention. Therefore, the present invention should not be construed as being limited to the description in the following embodiment modes. Note that in the present invention, like reference numerals refer to like parts throughout the drawings in the following embodiment modes.

Embodiment Mode 1

In this embodiment mode, a circuit configuration of a power source portion in the semiconductor device of the present invention will be described with reference to FIG. 1.

As shown in FIG. 1, the power source portion includes a rectifier circuit 100, a power supply circuit 101, a comparing portion 102, a substrate voltage generation portion 103, and a bias circuit 107.

The rectifier circuit 100 rectifies and smoothes a signal inputted from a +V terminal which is a signal input terminal and thus generates a DC voltage $V_{DC}$ which is a first DC voltage and outputs the DC voltage $V_{DC}$ to a +Va terminal.

The power supply circuit 101 makes a DC voltage $V_{DC}$ which is inputted from the +Va terminal be constant and thus generates a power supply voltage and outputs the power supply voltage to a +Vb terminal.

The bias circuit 107 generates a reference voltage $V_{\_BIAS}$ from the DC voltage $V_{DC}$ which is inputted from the +Va terminal and outputs the reference voltage $V_{\_BIAS}$ to the power supply circuit 101 and the comparing portion 102. It is to be noted that in a case where the reference voltage $V_{\_BIAS}$ is generated in the power supply circuit 101 or in the case where the reference voltage V_BIAS is not necessary, it is allowed that the reference voltage $V_{\_BIAS}$ is not outputted to the power supply circuit 101 from the bias circuit 107.

The comparing portion 102 includes a comparing circuit 104, a resistor 108, and a transistor group 109. The resistor 108 and the transistor group 109 generate a DC voltage $V_{DC'}$ based on a DC voltage $V_{DC}$ generated in the rectifier circuit 100 and output the DC voltage $V_{DC'}$ to the comparing circuit 104. While the transistor group 109 is used to generate the DC voltage $V_{DC'}$ here, a resistor can be substituted for the transistor group 109.

The comparing circuit 104 compares the levels of the DC voltage $V_{DC'}$ and the reference voltage $V_{\_BIAS}$ and outputs the comparison result to the substrate voltage generation portion 103.

The substrate voltage generation portion 103 includes a substrate voltage generation circuit 105 and a switch 106. On or off of the switch 106 is selected in accordance with a signal inputted from the comparing circuit 104 so that connection or disconnection between the +V terminal and the substrate voltage generation circuit 105 is selected. When the switch 106 is on, the substrate voltage generation circuit 105 is connected to the +V terminal and a signal is inputted to the substrate voltage generation circuit 105 from the +V terminal. The substrate voltage generation circuit 105 rectifies and smoothes the signal inputted from the +V terminal and thus generates a DC voltage $V_{SUB}$ which is a second DC voltage and outputs the DC voltage $V_{SUB}$ to the rectifier circuit 100. When the switch 106 is off, the substrate voltage generation circuit 105 outputs a potential equal to that of the −V terminal to the rectifier circuit 100.

Although not shown in FIG. 1, in a semiconductor device to which a signal is supplied from an antenna, for example, a +terminal of the antenna is connected to the +V terminal, whereas a −terminal of the antenna is connected to the −V terminal.

Next, the configuration of each circuit is described.

The configuration of the rectifier circuit 100 is described with reference to FIG. 2. Note that while it is assumed that a first transistor 201 and a second transistor 202 are n-channel transistors in this embodiment mode, p-channel transistors may be used when the connection destination of a gate terminal of each transistor is changed from one of a source terminal and the drain terminal to the other of the source terminal and the drain terminal, and the connection destination of a gate terminal of each transistor of the substrate voltage generation circuit 105 which will be described below is made to be opposite.

Figure 2:
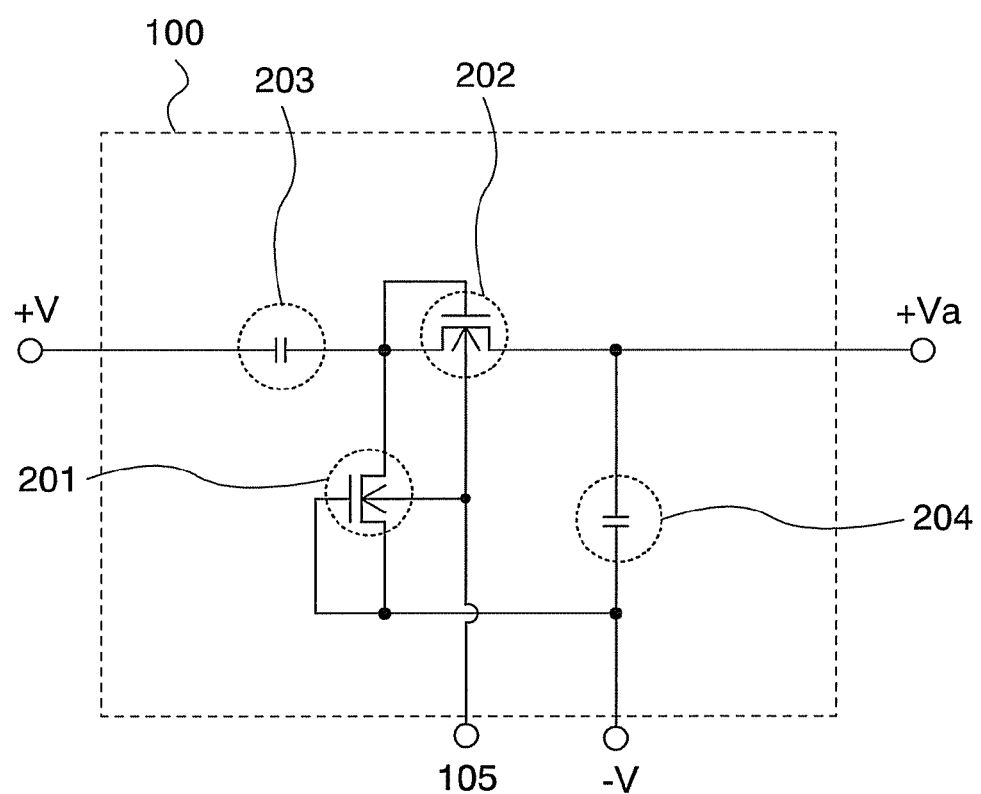
FIG. 2 is a diagram showing a circuit configuration of a rectifier circuit of Embodiment Mode 1.

The configuration of the rectifier circuit 100 is shown in FIG. 2. The rectifier circuit 100 includes the first transistor 201 of which one of the source terminal and the drain terminal is connected to the −V terminal; the second transistor 202 of which one of the source terminal and the drain terminal is connected to the other of the source terminal and the drain terminal of the first transistor 201 and of which the other of the source terminal and the drain terminal is connected to the +Va terminal; a first capacitor 203 of which a first terminal is connected to the +V terminal and of which a second terminal is connected to the other of the source terminal and the drain terminal of the first transistor 201 and one of the source terminal and the drain terminal of the second transistor 202; and a second capacitor 204 of which a first terminal is connected to the +Va terminal and the other of the source terminal and the drain terminal of the second transistor 202 and of which a second terminal is connected to the −V terminal and one of the source terminal and the drain terminal of the first transistor 201.

The gate terminal of each of the first transistor 201 and the second transistor 202 is connected to one of the source terminal and the drain terminal thereof.

Further, as each of the first transistor 201 and the second transistor 202, for example, a transistor using a semiconductor substrate can be used. Semiconductor layers of the first transistor 201 and the second transistor 202 each of which uses a semiconductor substrate are provided using the same semiconductor substrate, and the semiconductor layer of each of the transistors is separated by an element separating layer. Further, each of the first transistor 201 and the second transistor 202, which uses a transistor using a semiconductor substrate, includes a substrate terminal provided so as to be independently controlled. The substrate terminals of the first transistor 201 and the second transistor 202 are connected to the substrate voltage generation circuit 105.

In the case of using transistors using semiconductor substrates as the first transistor 201 and the second transistor 202, a single crystal semiconductor layer of the semiconductor substrate, which functions as an active layer, includes at least a first to third impurity regions. The first impurity region is a source region, the second impurity region is a drain region, and the third impurity region is a region to which a voltage is applied. In each of the transistors having the first to third impurity regions, a first voltage is applied to the active layer from a gate and a second voltage is applied to the active layer from the third impurity region. By controlling the first voltage and the second voltage which are applied to the active layer, the threshold voltages of the transistors can be controlled. Note that the third impurity region is referred to as a substrate terminal and a voltage applied to the third impurity region is referred to as a substrate voltage, in some cases.

Alternatively, a transistor which uses an SOI substrate and includes a single crystal semiconductor film may be used. In a case of such a transistor, a region which functions as a substrate terminal can be provided in part of a substrate and further, little variation in electrical characteristics, size, or shape, a higher current supply function, and a smaller size will be achieved.

As the first transistor 201 and the second transistor 202, transistors each of which is provided with a first gate terminal and a second gate terminal with an active layer interposed therebetween can be used. In each of the transistors having the first and second gate terminals, a first voltage is applied to the active layer from the first gate terminal and a second voltage is applied to the active layer from the second gate terminal. By controlling the first voltage and the second voltage which are applied to the active layer, the threshold voltages of the transistors can be controlled. Note that one of the first gate terminal and the second gate terminal is referred to as a substrate terminal and a voltage applied to the substrate terminal is referred to as a substrate voltage, in some cases. As for an example of a transistor which is controlled by the substrate voltage, a glass substrate, a quartz substrate, or the like can be used as a substrate, and a non-single crystal semiconductor film of amorphous silicon, polycrystalline silicon, microcrystalline (also referred to as microcrystal or semi-amorphous) silicon, or the like can be used for a semiconductor layer.

Further, as the first transistor 201 and the second transistor 202, MOS transistors, junction transistors, or the like can be used. In the case of MOS transistors, for example, the semiconductor substrates can be applied and high mobility can be achieved; therefore, the transistors can be reduced in size.

The power supply circuit 101 has a function of generating a constant power supply voltage by using a DC voltage inputted from the rectifier circuit 100. As the power supply circuit 101, a regulator or the like can be used.

Next, the configuration of the comparing portion 102 is described with reference to FIG. 3. In this embodiment mode, it is assumed that a first transistor 402 and a second transistor 403 are a p-channel transistor and an n-channel transistor, respectively.

Further, while it is assumed that a transistor group 401 is an n-channel transistor, a p-channel transistor may be used when the connection destination of a gate terminal of each transistor is changed from one of a source terminal and a drain terminal to the other of the source terminal and the drain terminal.

Figure 3:
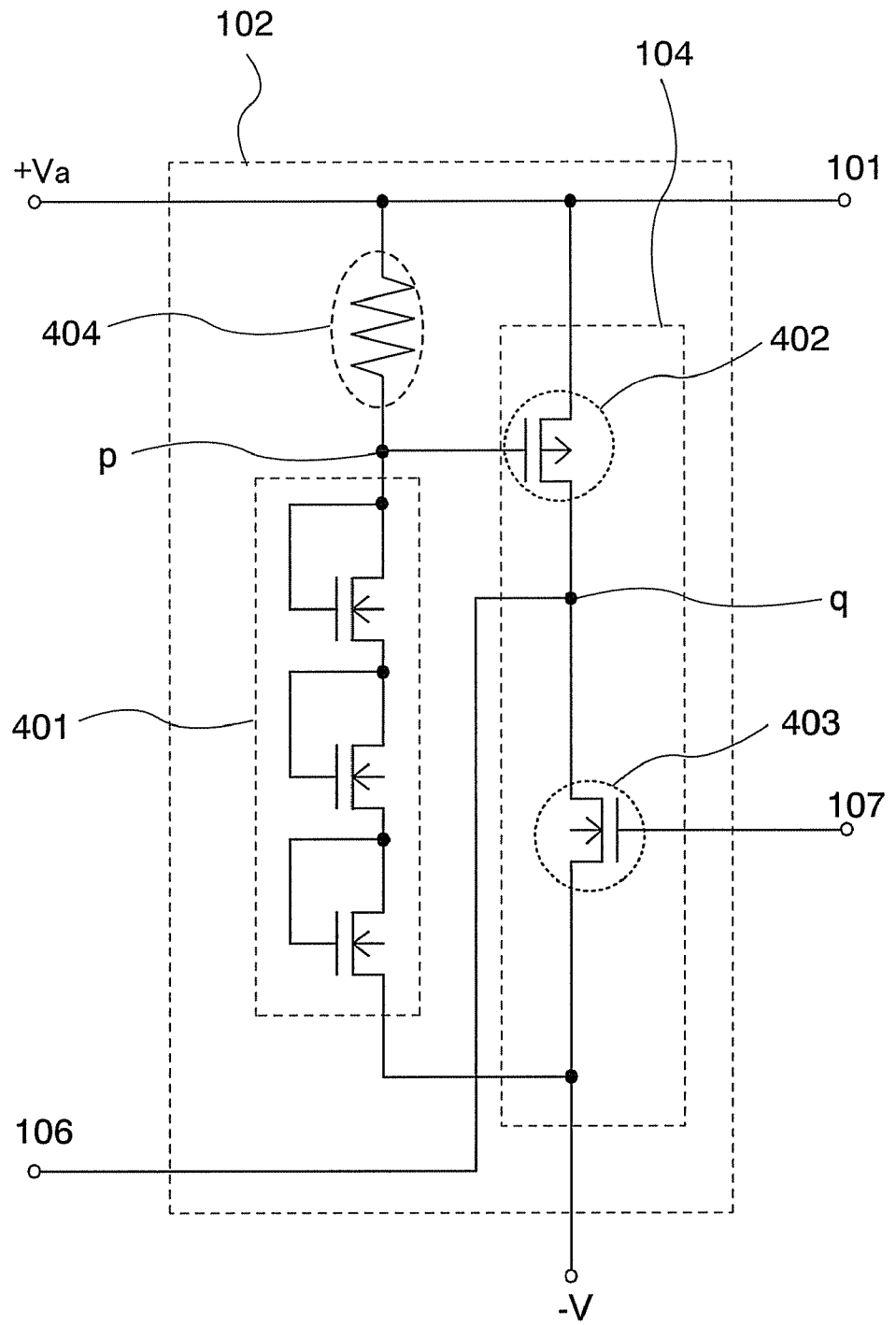
FIG. 3 is a diagram showing one mode of a circuit configuration of a comparing portion of Embodiment Modes 1 and 2.

As shown in FIG. 3, the comparing portion 102 includes the transistor group 401 (corresponding to the transistor group 109 in FIG. 1) including a given number of transistors; the first transistor 402 of which a gate terminal is connected to the transistor group 401, of which one of the source terminal and the drain terminal is connected to the switch 106, and of which the other of the source terminal and the drain terminal is connected to the +Va terminal; a second transistor 403 of which a gate terminal is connected to the bias circuit 107, of which one of a source terminal and a drain terminal is connected to one of a source terminal and a drain terminal of the first transistor 402, and of which the other of the source terminal and the drain terminal is connected to the transistor group 401 and the −V terminal; and a resistor 404 (corresponding to the resistor 108 in FIG. 1) of which one end is connected to one end of the transistor group 401 and the gate terminal of the first transistor 402 and of which the other end is connected to the +Va terminal. Note that a gate terminal of each transistor of the transistor group 401 is connected to one of a source terminal and a drain terminal. Further, a connection point of a gate terminal of the first transistor 402, one end of the transistor group 401, and one end of the resistor 404 is a node p, and a connection point of the switch 106 in FIG. 1, one of the source terminal and the drain terminal of the first transistor 402, and one of the source terminal and the drain terminal of the second transistor 403 is a node q.

Note that the comparing portion 102 may have another configuration. The configuration of the comparing portion 102 is described with reference to FIGS. 4A and 4B.

Figure 4A:
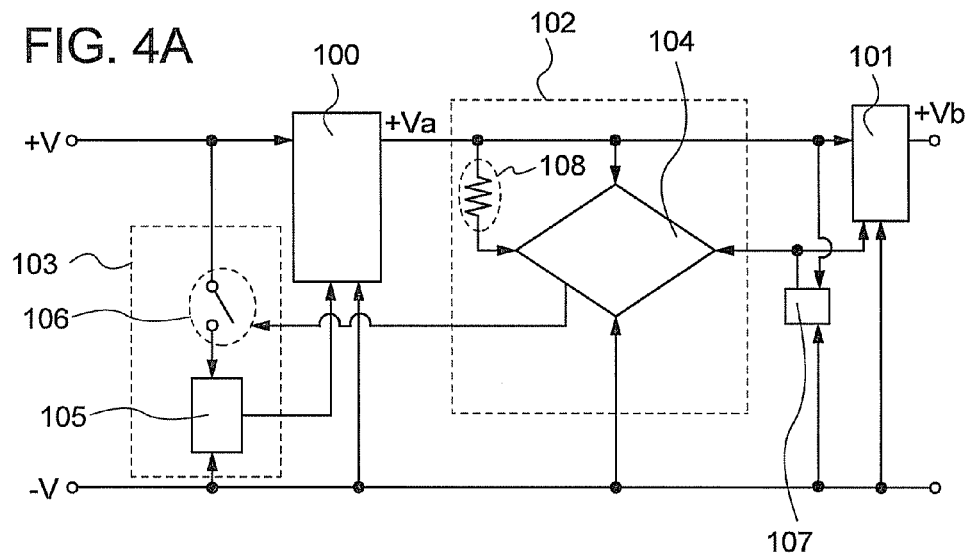
FIGS. 4A and 4B are diagrams showing different configurations of a comparing portion of the present invention.
Figure 4B:
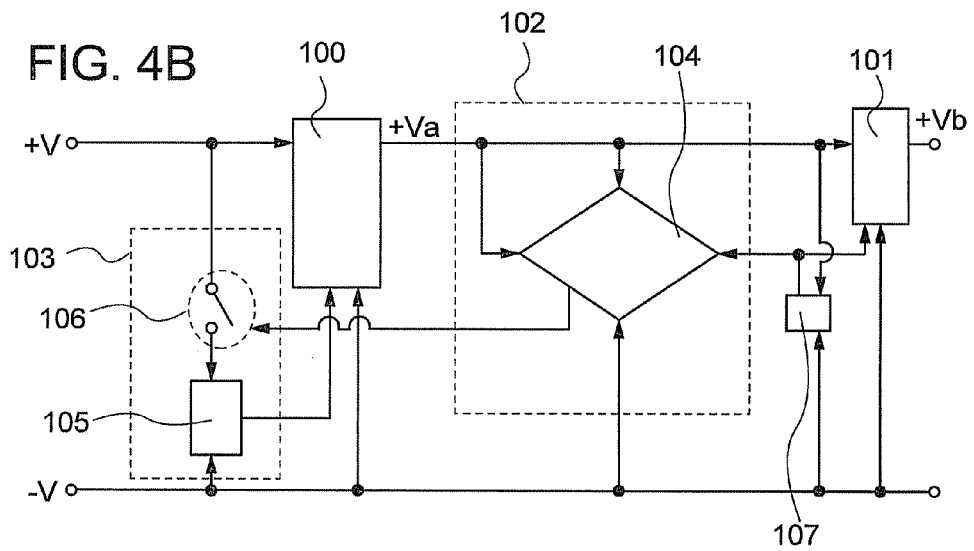

The comparing portion 102 may have, for example, a configuration where the resistor 108 is provided between the +Va terminal and an input terminal of the comparing circuit 104 as shown in FIG. 4A or a configuration where the resistor 108 and the transistor group 109 are not provided as shown in FIG. 4B. If a signal is inputted from external, a current flows to an element. The amount of current flowing to the element is proportional to a load of the element. One of such configurations is selectively used so that a comparison operation can be performed by reducing a load of the element in accordance with the amount of current flowing to the element.

The bias circuit 107 has a function of generating a reference voltage $V_{\_BIAS}$ and inputting the $V_{\_BIAS}$ to the comparing portion 102. Note that in a case where the reference voltage $V_{\_BIAS}$ is necessary for the power supply circuit 101, the bias circuit 107 may be provided in the power supply circuit 101. If provided, the bias circuit 107 inputs the reference voltage $V_{\_BIAS}$, so that the circuit can be simplified.

The configuration of the substrate voltage generation circuit 105 is described. Note that while it is assumed that a first transistor 301 and a second transistor 302 are n-channel transistors in this embodiment mode, p-channel transistors may be used when the connection destination of a gate terminal of each transistor is changed from the other of a source terminal and a drain terminal to one of the source terminal and the drain terminal.

Figure 5:
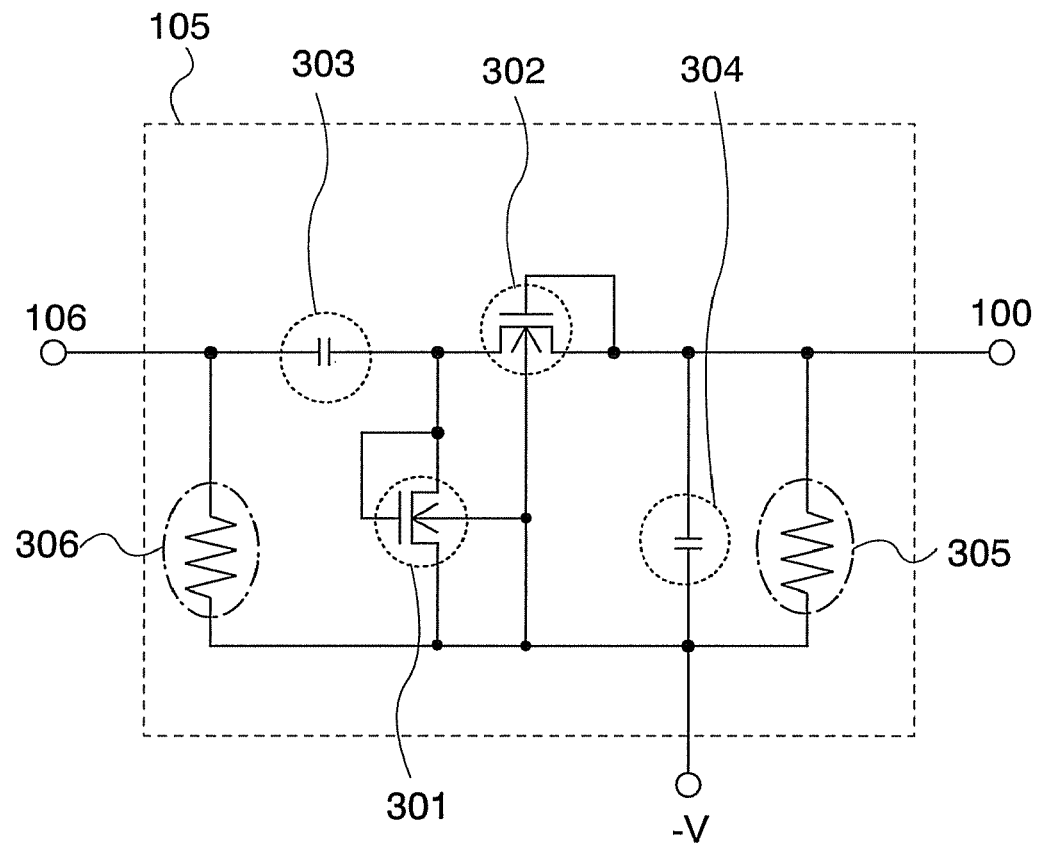
FIG. 5 is a diagram showing a circuit configuration of a substrate voltage generation circuit of Embodiment Mode 1.

The configuration of the substrate voltage generation circuit 105 is shown in FIG. 5. The substrate voltage generation circuit 105 includes the first transistor 301 of which one of the source terminal and the drain terminal is connected to the −V terminal; the second transistor 302 of which one of the source terminal and the drain terminal is connected to the other of the source terminal and the drain terminal of the first transistor 301 and of which the other of the source terminal and the drain terminal is connected to the rectifier circuit 100 in FIG. 1; a first capacitor 303 of which a first terminal is connected to the switch 106 in FIG. 1 and of which a second terminal is connected to the other of the source terminal and the drain terminal of the first transistor 301 and one of the source terminal and the drain terminal of the second transistor 302; and a second capacitor 304 of which a first terminal is connected to the other of the source terminal and the drain terminal of the second transistor 302 and of which a second terminal is connected to one of the source terminal and the drain terminal of the first transistor 301; a resistor 305 of which one end is connected to the other of the source terminal and the drain terminal of the second transistor 302 and the first terminal of the second capacitor 304 and of which the other end is connected to one of the source terminal and the drain terminal of the second transistor 302 and the second terminal of the second capacitor 304; and a resistor 306 of which one end is connected to a first terminal of the first capacitor 303 and of which the other end is connected to one of the source terminal and the drain terminal of the first transistor 301. The gate terminal of each of the first transistor 301 and the second transistor 302 is connected to the other of the source terminal and the drain terminal thereof. Substrate terminals of the first transistor 301 and the second transistor 302 are connected to the −V terminal.

The switch 106 can be anything such as an electrical switch or a mechanical switch as long as it can control a current flow. As the switch 106, for example, a transistor (such as a junction transistor or a MOS transistor) can be used. The substrate voltage generation circuit 105 is connected to the +V terminal in FIG. 1 through the switch 106.

Next, operation in the power source portion of this embodiment mode will be described.

The signal received from the antenna is inputted to the +V terminal and the −V terminal.

Note that in this embodiment mode, an operation of the power source portion with respect to the signal of the +V terminal when the signal of the −V terminal is a reference signal and is regarded to be constant is described for simplification. In the case of the semiconductor device to which a signal is supplied from the antenna, an input signal may be mainly a differential signal. A differential signal refers to a signal generated by using a pair of signal lines, transmitting signals in opposite phases to the pair of signal lines, and adding the values of the signals of the signal lines together. This embodiment mode is applicable even in the case where the input signal is a differential signal because a difference is only whether a reference signal is constant or not.

First, the operation of the rectifier circuit 100 in a case where the potential of the substrate terminal is equal to that of the −V terminal will be described with reference to FIG. 2.

The signal inputted from the +V terminal (hereinafter referred to as a first input terminal) is inputted to the other of the source terminal and the drain terminal of the first transistor 201. The first transistor 201 rectifies the first input signal because it is turned on when the potential of the first input terminal inputted to the other of the source terminal and the drain terminal is lower than that of one of the source terminal and the drain terminal, whereas be turned off when the potential of the first input terminal inputted to the other of the source terminal and the drain terminal is higher than that of one of the source terminal and the drain terminal. The first transistor 201 outputs the rectified signal to the first capacitor 203. The first capacitor 203 smoothes the inputted signal and outputs the smoothed signal to which the first input signal inputted from the +V terminal is added (hereinafter referred to as a second input signal) to one of the source terminal and the drain terminal of the second transistor 202. The second transistor 202 rectifies the second input signal because it is turned on when the potential of the second input signal inputted to one of the source terminal and the drain terminal is higher than that of the other of the source terminal and the drain terminal, whereas be turned off when the potential of the second input signal inputted to one of the source terminal and the drain terminal is lower than that of the other of the source terminal and the drain terminal. The second transistor 202 outputs the rectified second input signal to the second capacitor 204. The second capacitor 204 smoothes the rectified signal inputted from the second transistor 202 and the smoothed second input signal is inputted as a DC voltage $V_{DC}$ to the comparing portion 102.

As described above, in the power source portion, the rectifier circuit 100 rectifies and smoothes the signal inputted from the antenna so that the DC voltage $V_{DC}$ is generated.

Note that the rectifier circuit 100 in this embodiment mode is a half-wave voltage doubler rectifier circuit and rectifies and smoothes the first input signal to which the signal smoothed by the first capacitor as the second input signal; therefore, the DC voltage $V_{DC}$ to be outputted can be higher than a voltage of the input signal. The value of the DC voltage $V_{DC}$ at this time is positive.

Note that when the voltage which is inputted to the rectifier circuit 100 is $V_{IN}$ and the threshold voltage of a transistor included in the rectifier circuit 100 is $V_{th}$, the theoretical formula for obtaining the DC voltage $V_{DC}$ which is an output of the voltage doubler rectifier circuit is expressed by Formula 1.

$$V_{DC}=2N(V_{IN}-V_{th})$$ [Formula 1]

In Formula 1, N represents the number of stages of the voltage doubler rectifier circuit. When the voltage doubler rectifier circuit including two transistors and two capacitors has one stage, the rectifier circuit shown in FIG. 2 has one stage and thus N=1 is satisfied.

Therefore, as the rectifier circuit 100, a half-wave voltage quadrupler rectifier circuit, a half-wave voltage sextupler rectifier circuit, or the like can be used in order to obtain a high DC voltage $V_{DC}$. Alternatively, an all-wave rectifier circuit may be used.

Next, the operation of the comparing portion 102 is described with reference to FIG. 3. To the comparing portion 102, a DC voltage $V_{DC}$ is inputted from the rectifier circuit 100 and a reference voltage $V_{-BIAS}$ is inputted from the bias circuit 107. Here, the higher an input voltage $V_{IN}$ is, the higher the DC voltage $V_{DC}$ is, as expressed by Formula 1. That is, the larger the amount of power supplied from the antenna is, the higher the DC voltage $V_{DC}$ is.

First, the operations of the transistor group 401 and the resistor 404 are described. The transistor group 401 and the resistor 404 generate a DC voltage $V_{DC'}$ from the DC voltage $V_{DC}$. The DC voltage $V_{DC'}$ is determined by the product of the DC voltage $V_{DC}$ and the ratio of the resistance value of the transistor group 401 to the sum of the resistance value of the resistor 404 and the resistance value of the transistor group 401 that is regarded as a resistor.

Therefore, when the value of the DC voltage $V_{DC}$ is small enough that all transistors of the transistor group 401 are off, the transistor group 401 is off. Since the transistor group 401 can be regarded to have extremely higher resistance than the resistor 404 at this time, the DC voltage $V_{DC'}$ approximates to the DC voltage $V_{DC}$.

On the other hand, when the value of the DC voltage $V_{DC}$ is large enough that all transistors of the transistor group 401 are on, the threshold voltage of the entire of the transistor group 401, the transistor group 401 is on. Since the transistor group 401 can be regarded to have equivalent or lower resistance to or than the resistor 404 at this time, the DC voltage $V_{DC}$ is also reduced. The higher the DC voltage $V_{DC}$ is, the larger the potential difference between the DC voltage $V_{DC}$ and the generated DC voltage $V_{DC'}$ is.

Here, the case where the value of the DC voltage $V_{DC}$ is small enough that all transistors of the transistor group 401 are off corresponds to a case where power supplied from the antenna is appropriate. The case where the value of the DC voltage $V_{DC}$ is large enough that all transistors of the transistor group 401 are on corresponds to a case where power supplied from the antenna is high and thus deterioration, breakage, or malfunction of an element might be caused.

Note that although the case where the number of transistors of the transistor group 401 is three is shown in FIG. 3; however, the number of transistors of the transistor group 401 is not limited thereto. By changing the number of transistors of the transistor group 401, the value of the DC voltage $V_{DC}$ which is large enough that all transistors of the transistor group 401 are on can be changed; therefore, the threshold voltage of the transistor of the transistor group 401 can be set in consideration of deterioration, breakage, or malfunction of an element.

Next, the operation of the comparing circuit 104 is described with reference to FIG. 3. When the value of the DC voltage $V_{DC}$ is small enough that all transistors of the transistor group 401 are off, the DC voltage $V_{DC'}$ approximates to the DC voltage $V_{DC}$ as described above and inputted to the comparing circuit 104 so that the first transistor 402 is turned off. The reference voltage $V_{-BIAS}$ is constantly inputted to the comparing circuit 104 from the bias circuit 107, so that the second transistor 403 is turned on. Therefore, the node q is at a potential approximately equal to that of the −V terminal and a terminal of the switch 106 in FIG. 1, which is connected to the node q, is set to be at a potential approximately equal to that of the −V terminal.

On the other hand, when the value of the DC voltage $V_{DC}$ is large enough that all transistors of the transistor group 401 are on, the DC voltage $V_{DC'}$ varies in accordance with the relation between the threshold voltage of each transistor of the transistor group 401 and the DC voltage $V_{DC}$. When the DC voltage $V_{DC'}$ is reduced, the first transistor 402 is turned on. The amount of current flowing through the first transistor 402 is increased as the level of the DC voltage $V_{DC'}$ is reduced. The second transistor 403 is constantly on so that a certain current constantly flows therethrough. Here, the potential of the node q is determined by the amount of current flowing through the first transistor 402 and the second transistor 403. When the amount of current flowing through the first transistor 402 is larger than the amount of current flowing through the second transistor 403, the potential of the node q is increased. That is, the lower the DC voltage $V_{DC'}$ is, the higher the potential of the node q is. Further, the higher the DC voltage $V_{DC}$ is, the higher the potential of the node q is. The potential of the node q is outputted to the terminal of the switch 106 in FIG. 1, which is connected to the node q.

Next, the operations of the substrate voltage generation circuit 105 and the switch 106 which are included in the substrate voltage generation portion 103 are described with reference to FIGS. 1 and 5. Here, it is assumed that the switch 106 is an n-channel transistor. Further, one of the source terminal and the drain terminal is connected to the +V terminal, the other of the source terminal and the drain terminal is connected to the −V terminal, and the gate terminal is connected to the comparing portion 102.

When the value of the DC voltage $V_{DC'}$ is small enough that all transistors of the transistor group 401 are off, the potential of the gate terminal of the switch 106, which is connected to the node q, is changed from the potential of the node q to the potential of the −V terminal and the potential of the −V terminal is transmitted to the other of the source terminal and the drain terminal of the switch 106 through the resistor 306, so that the switch 106 is turned off. At this time, the voltage outputted from the rectifier circuit 100 is equal to the potential of the −V terminal through the resistor 305, and the resistance values of the resistor 305 and the resistor 306 are preferably large enough not to affect substrate voltage generation.

On the other hand, when the value of the DC voltage $V_{DC}$ is large enough that all transistors of the transistor group 401 are on, the potential of the node q is inputted to the gate terminal of the switch 106, and the potential of −V terminal is transmitted to the other of the source terminal and the drain terminal of the switch 106 through the resistor 306, so that the switch 106 is turned on. Therefore, a signal (first input signal) externally inputted from the +V terminal is inputted to the substrate voltage generation circuit 105.

Here, when the switch 106 is turned on, the signal which is inputted from external is supplied to the rectifier circuit 100 and the substrate voltage generation circuit 105. In that case, the amount of power supplied to the rectifier circuit 100 is reduced by the amount of power supplied to the substrate voltage generation circuit 105 as compared to the case where power is supplied to only the rectifier circuit 100, so that a load on an element included in the rectifier circuit 100 is reduced.

As expressed by Formula 1, reduction in the amount of supply power from the antenna leads to reduction in the input voltage $V_{IN}$, so that the DC voltage $V_{DC}$ generated by the rectifier circuit 100 also reduces.

Here, the value of the DC voltage $V_{DC}$ would be small enough that all transistors of the transistor group 401 are off; however, when the value of the DC voltage $V_{DC}$ is large enough that all transistors of the transistor group 401 are on, the substrate voltage generation circuit 105 operates in the following manner.

In the substrate voltage generation circuit 105, the connection destinations of the substrate terminals and the gate terminals of the first transistor 301 and the second transistor 302 differ from those in the rectifier circuit 100 and the resistors 305 and 306 are additionally provided. Since the connection destination of the gate terminal is not one of the source terminal and the drain terminal but the other of the source terminal and the drain terminal, a DC voltage $V_{SUB}$ which is an output of the substrate voltage generation circuit 105 in that case is lower than the potential of the −V terminal. When the voltage which is inputted to the substrate voltage generation circuit is $V_{IN'}$ and the threshold voltage of a transistor included in the substrate voltage generation circuit 105 is $V_{th}$, the theoretical formula for obtaining the DC voltage $V_{SUB}$ is expressed by Formula 2.

$$-V_{SUB}=-2N(V_{IN'}-V_{th}) \quad \text{[Formula 2]}$$

In Formula 2, N represents the number of stages of the voltage doubler rectifier circuit. When the voltage doubler rectifier circuit including two transistors and two capacitors has one stage, the substrate voltage generation circuit 105 shown in FIG. 5 has one stage and thus N=1 is satisfied.

The DC voltage $V_{SUB}$ generated in the substrate voltage generation circuit 105 is outputted to the substrate terminals of the first transistor 201 and the second transistor 202 of the rectifier circuit 100 in FIG. 2.

The operation of the rectifier circuit 100 is described with reference to FIG. 2 again. Here, the potential of the substrate terminal is lower than the potential of the −V terminal. This is because when the value of the DC voltage $V_{DC}$ is large enough that all transistors of the transistor group 401 are on, the potential of the node q of the comparing circuit 104 is increased so that the switch 106 is turned on, as described above. Thus, the DC voltage $V_{SUB}$ lower than a voltage of the −V terminal is outputted to the rectifier circuit 100 from the substrate voltage generation circuit 105.

On the other hand, in the case where the potential of the substrate terminal and the potential of the −V terminal are equal or approximately equal to each other, that is, in the case where the value of the DC voltage $V_{DC}$ is small enough that all transistors of the transistor group 401 are off and power supplied from the antenna is appropriate, the switch 106 is off and the DC voltage $V_{SUB}$ that is equal or approximately equal to the voltage of the −V terminal is outputted to the rectifier circuit 100 from the substrate voltage generation circuit 105.

In the first transistor 201 and the second transistor 202 in the rectifier circuit 100, the threshold voltages $V_{th}$ of the transistors are controlled based on a substrate voltage assuming that the DC voltage $V_{SUB}$ inputted to the substrate terminal is the substrate voltage. For example, in the case where the first transistor 201 and the second transistor 202 are n-channel transistors, by reducing the substrate voltage, the threshold voltage $V_{th}$ can be increased and by increasing the substrate voltage, the threshold voltage $V_{th}$ can be reduced. Alternatively, in the case where the first transistor 201 and the second transistor 202 are p-channel transistors, by reducing the substrate voltage, the threshold voltage $V_{th'}$ can be reduced and by increasing the substrate voltage, the threshold voltage $V_{th'}$ can be increased.

Since the substrate voltages of the first transistor 201 and the second transistor 202 in the rectifier circuit 100 are lower than the normal substrate voltages thereof (substrate voltages when supplied power is appropriate), the threshold voltages $V_{th}$ of the first transistor 201 and the second transistor 202 are increased. Since the relation between the threshold voltage $V_{th}$ and the DC voltage $V_{DC}$ which is an output of the rectifier circuit 100 is as expressed by Formula 1, the higher the threshold voltages $V_{th}$ of the first transistor 201 and the second transistor 202 are, the lower the DC voltage $V_{DC}$ is.

As described above, even in the case where a high frequency signal strong enough to break an element is supplied, the power which is supplied to the rectifier circuit 100 can be divided. Further, an output voltage in the rectifier circuit 100 can be reduced by increasing the threshold voltages of the first transistor 201 and the second transistor 202 in the rectifier circuit 100. Therefore, the DC voltage $V_{DC}$ can be prevented from increasing.

With the structure of this embodiment mode, the threshold voltage of a transistor provided in the rectifier circuit is controlled so that an excess voltage is not applied to a circuit in the semiconductor device which can communicate within a given communication distance, even in the case where while the communication distance of the semiconductor device is changed, a high frequency signal strong enough to break an element is inputted and a large amount of current flows to a circuit. Therefore, the semiconductor device of which an element included in a circuit of the semiconductor device can normally operate without being deteriorated or broken can be provided.

Embodiment Mode 2

In this embodiment mode, configurations of the rectifier circuit 100 and the substrate voltage generation circuit 105 in the power source portion, which are different from that of Embodiment Mode 1 as shown in FIG. 1, will be described. Note that the configuration of each circuit other than the rectifier circuit 100 and the substrate voltage generation circuit 105 is the same as that of Embodiment Mode 1 and thus description in Embodiment Mode 1 is used supportively.

First, another configuration of the rectifier circuit 100 is described. Note that while it is assumed that the first transistor 211 and the second transistor 212 are n-channel transistors in this embodiment mode, p-channel transistors may be used when the connection destination of a gate terminal of each transistor is changed from one of a source terminal and a drain terminal to the other of the source terminal and the drain terminal, and the connection destination of a gate terminal of each transistor of the substrate voltage generation circuit 105, which is after-mentioned, is changed from the other of a source terminal and a drain terminal to one of the source terminal and the drain terminal.

Figure 6:
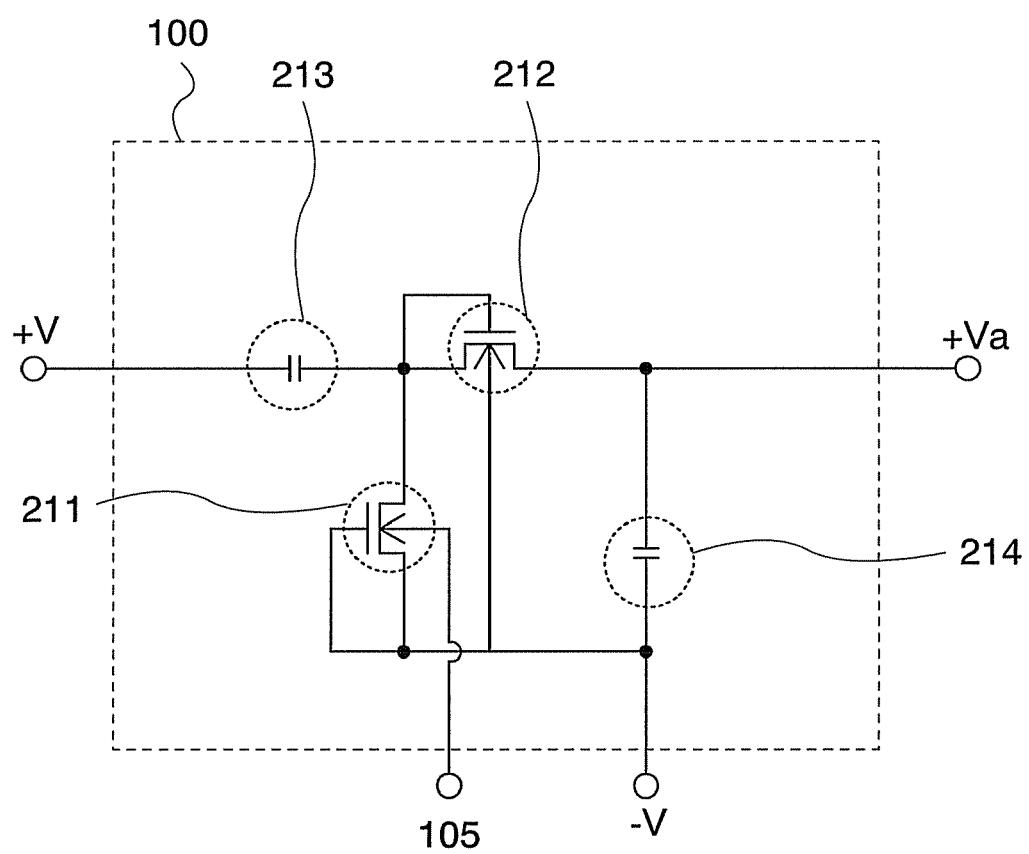
FIG. 6 is a diagram showing a circuit configuration of a rectifier circuit of Embodiment Mode 2

The configuration of the rectifier circuit 100 is shown in FIG. 6. The rectifier circuit 100 includes the first transistor 211 of which one of the source terminal and the drain terminal is connected to the −V terminal; the second transistor 212 of which one of the source terminal and the drain terminal is connected to the other of the source terminal and the drain terminal of the first transistor 211 and of which the other of the source terminal and the drain terminal is connected to the +Va terminal; a first capacitor 213 of which a first terminal is connected to the +V terminal and of which a second terminal is connected to the other of the source terminal and the drain terminal of the first transistor 211 and one of the source terminal and the drain terminal of the second transistor 212; and a second capacitor 214 of which a first terminal is connected to the +Va terminal and the other of the source terminal and the drain terminal of the second transistor 212 and of which a second terminal is connected to the −V terminal and one of the source terminal and the drain terminal of the first transistor 211. In the case where transistors using semiconductor substrates are used as the first transistor 211 and the second transistor 212 of the rectifier circuit 100, each of the first transistor 211 and the second transistor 212 includes a substrate terminal provided so as to be independently controlled. The substrate terminals of the first transistor 211 and the second transistor 212 are connected to the substrate voltage generation circuit 105 in FIG. 1 and the −V terminal, respectively.

In the case of using transistors using semiconductor substrates as the first transistor 211 and the second transistor 212, a single crystal semiconductor layer functioning as an active layer of the semiconductor substrate includes at least a first to third impurity regions. The first impurity region is a source region, the second impurity region is a drain region, and the third impurity region is a region to which a voltage is applied. In each of the transistors having the first to third impurity regions, a first voltage is applied to the active layer from a gate and a second voltage is applied to the active layer from the third impurity region. By controlling the first voltage and the second voltage which are applied to the active layer, the threshold voltages of the transistors can be controlled. Note that the third impurity region is referred to as a substrate terminal and a voltage applied to the third impurity region is referred to as a substrate voltage, in some cases.

The gate terminal of each of the first transistor 211 and the second transistor 212 is connected to one of the source terminal and the drain terminal thereof.

Alternatively, a transistor which uses a semiconductor substrate or an SOI substrate and includes a single crystal semiconductor film may be used. In a case of such a transistor, a region which functions as a substrate terminal can be provided in part of a substrate and further, little variation in electrical characteristics, size, or shape, a higher current supply function, and a smaller size will be achieved.

As the first transistor 211 and the second transistor 212, transistors each of which is provided with a first gate terminal and a second gate terminal with an active layer interposed therebetween can be used. In each of the transistors having the first and second gate terminals, a first voltage is applied to the active layer from the first gate terminal and a second voltage is applied to the active layer from the second gate terminal. By controlling the first voltage and the second voltage which are applied to the active layer, the threshold voltages of the transistors can be controlled. Note that one of the first gate terminal and the second gate terminal is referred to as a substrate terminal and a voltage applied to the substrate terminal is referred to as a substrate voltage, in some cases. As for an example of a transistor which is provided with a first gate terminal and a second gate terminal, a glass substrate, a quartz substrate, or the like can be used as a substrate, and a non-single crystal semiconductor film of amorphous silicon, polycrystalline silicon, microcrystalline (also referred to as microcrystal or semi-amorphous) silicon, or the like can be used for a semiconductor layer.

Further, as the first transistor 211 and the second transistor 212, MOS transistors, junction transistors, or the like can be used. In the case of MOS transistors, for example, the semiconductor substrates can be applied and high mobility can be achieved; therefore, the transistors can be reduced in size.

Another configuration of the substrate voltage generation circuit 105 is described. Note that while it is assumed that a first transistor 311, a second transistor 312, and the switch 106 are n-channel transistors in this embodiment mode, p-channel transistors may be used when the connection destination of a gate terminal of each transistor is changed from one of a source terminal and a drain terminal to the other of the source terminal and the drain terminal.

Figure 7:
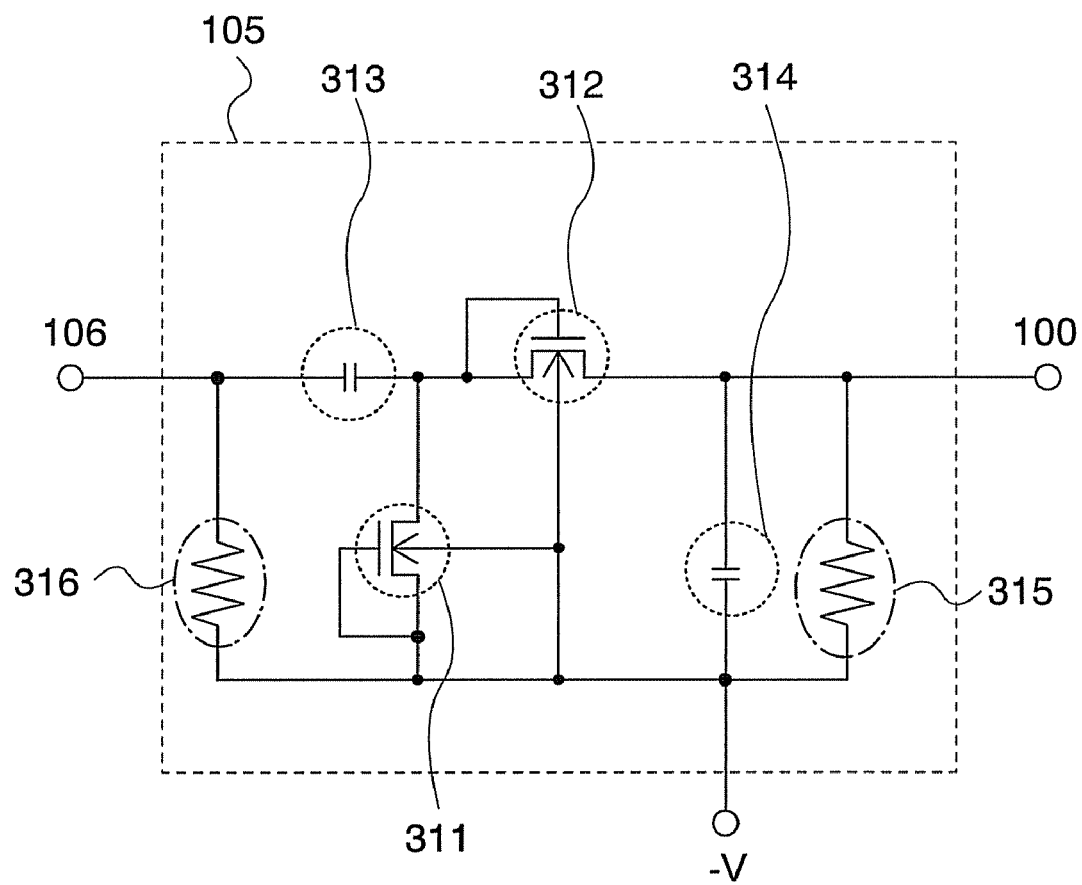
FIG. 7 is a diagram showing a circuit configuration of a substrate voltage generation circuit of Embodiment Mode 2.

The configuration of the substrate voltage generation circuit 105 is shown in FIG. 7. The substrate voltage generation circuit 105 includes the first transistor 311 of which one of the source terminal and the drain terminal is connected to the −V terminal; the second transistor 312 of which one of the source terminal and the drain terminal is connected to the other of the source terminal and the drain terminal of the first transistor 311 and of which the other of the source terminal and the drain terminal is connected to the rectifier circuit 100 in FIG. 1; a first capacitor 313 of which a first terminal is connected to the switch 106 in FIG. 1 and of which a second terminal is connected to the other of the source terminal and the drain terminal of the first transistor 311 and one of the source terminal and the drain terminal of the second transistor 312; and a second capacitor 314 of which a first terminal is connected to the other of the source terminal and the drain terminal of the second transistor 312 and of which a second terminal is connected to one of the source terminal and the drain terminal of the first transistor 311; a resistor 315 of which one end is connected to the other of the source terminal and the drain terminal of the second transistor 312 and the first terminal of the second capacitor 314 and of which the other end is connected to one of the source terminal and the drain terminal of the first transistor 311 and the second terminal of the second capacitor 314; and a resistor 316 of which one end is connected to a first terminal of the first capacitor 313 and of which the other end is connected to one of the source terminal and the drain terminal of the first transistor 311. The gate terminal of each of the first transistor 311 and the second transistor 312 is connected to one of the source terminal and the drain terminal. Substrate terminals of the first transistor 311 and the second transistor 312 are connected to the −V terminal.

Next, operation in the power source portion of this embodiment mode will be described. It is to be noted that the operation in the power source portion in the case where the value of the DC voltage $V_{DC}$ is small enough that all transistors of the transistor group 401 are off, that is, in the case where power supplied from the antenna is appropriate is the same as that in Embodiment Mode 1, thus, description in Embodiment Mode 1 is used supportively. Therefore, the case where the value of the DC voltage $V_{DC}$ is large enough that all transistors of the transistor group 401 are on, that is, the case where power supplied from the antenna is high is described here.

The signal received from external is inputted to the rectifier circuit 100 from the +V terminal and the −V terminal which are signal input terminals.

Note that in this embodiment mode, an operation with respect to the signal of the +V terminal when the signal of the −V terminal is a reference signal and is regarded to be constant is described for simplification. In the case of the semiconductor device to which a signal is supplied from the antenna, an input signal may be a differential signal; however, this embodiment mode is applicable even in the case where the input signal is a differential signal because a difference is only whether a reference signal is constant or not.

First, the operation of the substrate voltage generation circuit 105 is described with reference to FIGS. 1 and 7.

When the value of the DC voltage $V_{DC}$ is large enough that all transistors of the transistor group 401 are on, the potential of the node q is inputted to the gate terminal of the switch 106 and the potential of −V terminal is transmitted to the other of the source terminal and the drain terminal of the switch 106 through the resistor 306, so that the switch 106 is turned on. Therefore, a signal (first signal) externally inputted from the +V terminal is inputted to the substrate voltage generation circuit 105.

Here, when the switch 106 is turned on, the signal which is externally inputted is supplied to the rectifier circuit 100 and the substrate voltage generation circuit 105. In that case, the amount of power supplied to the rectifier circuit 100 is reduced by the amount of power supplied to the substrate voltage generation circuit 105 as compared to the case where power is supplied to only the rectifier circuit 100, so that a load to an element included in the rectifier circuit 100 is reduced.

As expressed by Formula 1, the amount of supply power from the antenna is reduced and thus the input voltage $V_{IN}$ is reduced, so that the DC voltage $V_{DC}$ generated by the rectifier circuit 100 is also reduced.

Here, the value of the DC voltage $V_{DC}$ would be small enough that all transistors of the transistor group 401 are off; however, when the value of the DC voltage $V_{DC}$ is large enough that all transistors of the transistor group 401 are on, the substrate voltage generation circuit 105 operates in a following manner.

Although the substrate voltage generation circuit 105 has almost the same configuration as the rectifier circuit 100, the connection destinations of the substrate terminals of the first transistor 311 and the second transistor 312 differ from those in the rectifier circuit 100 and the resistors 315 and 316 are additionally provided, in the substrate voltage generation circuit 105. Since the connection destination of each of the gate terminals is one of the source terminal and the drain terminal, a DC voltage $V_{SUB}$ which is an output of the substrate voltage generation circuit 105 in that case is higher than the potential of the −V terminal. When the voltage which is inputted to the substrate voltage generation circuit 105 is $V_{IN'}$ and the threshold voltage of a transistor included in the substrate voltage generation circuit 105 is $V_{th}$, the theoretical formula for obtaining the DC voltage $V_{SUB}$ is expressed by Formula 3.

$$V_{SUB}=2N(V_{IN'}-V_{th}) \quad \text{[Formula 3]}$$

In Formula 3, N represents the number of stages of the voltage doubler rectifier circuit. When the voltage doubler rectifier circuit including two transistors and two capacitors has one stage, the substrate voltage generation circuit 105 shown in FIG. 5 has one stage and thus N=1 is satisfied.

The DC voltage $V_{SUB}$ which is a second DC voltage and is generated in the substrate voltage generation circuit 105 is outputted to the substrate terminals of the first transistor 211 of the rectifier circuit 100 in FIGS. 1 and 7.

Next, the operation of the rectifier circuit 100 is described with reference to FIG. 6. Here, the potential of the substrate terminal is higher than the potential of the −V terminal. This is because when the value of the DC voltage $V_{DC}$ is large enough that all transistors of the transistor group 401 are on, the potential of the node q of the comparing circuit 104 is increased so that the switch 106 is turned on, as described above. Thus, the DC voltage $V_{SUB}$ higher than the voltage of the −V terminal is outputted from the substrate voltage generation circuit 105 and inputted to the rectifier circuit 100.

In the first transistor 211 in the rectifier circuit 100, the threshold voltages $V_{th}$ of the transistors are controlled based on a substrate voltage assuming that the DC voltage $V_{SUB}$ inputted to the substrate terminal is the substrate voltage. For example, in the case where the first transistor 211 is an n-channel transistor, by reducing the substrate voltage, the threshold voltage $V_{th}$ can be increased and by increasing the substrate voltage, the threshold voltage $V_{th}$ can be reduced. Alternatively, in the case where the first transistor 211 is a p-channel transistor, by reducing the substrate voltage, the threshold voltage $V_{th'}$ can be reduced and by increasing the substrate voltage, the threshold voltage $V_{th'}$ can be increased.

Since the substrate voltage of the first transistor 211 in the rectifier circuit 100 is higher than the normal substrate voltage thereof (substrate voltages when supplied power is appropriate), the threshold voltages $V_{th}$ of the first transistor 211 is reduced. When the threshold voltage $V_{th}$ of the first transistor 211 is less than 0, the first transistor 211 cannot be turned off and is constantly on, so that a current flows constantly. Thus, the first transistor 211 loses the rectification function and performs only the same operation as the resistor. The rectifier circuit 100 cannot achieve voltage doubling and operates as a half-wave rectifier circuit. When the input voltage and the output voltage of a half-wave rectifier circuit are $V_{IN}$ and the DC voltage $V_{DC}$, respectively, Formula 4 is satisfied. Here, the input voltage is $V_{IN}$ and the threshold voltage of a MOS transistor included in the half-wave rectifier circuit is $V_{th}$.

$$V_{DC} = (V_{IN} - V_{th})$$ [Formula 4]

Therefore, in the rectifier circuit 100, the DC voltage $V_{DC}$ is also reduced as the threshold voltage $V_{th}$ of the first transistor 201 is extremely lower than the normal voltage (a voltage when supplied power is appropriate).

Note that as the rectifier circuit 100, a half-wave voltage quadrupler rectifier circuit, a half-wave voltage sextupler rectifier circuit, or an all-wave rectifier circuit may be used.

As described above, in the case where a high frequency signal strong enough to break an element is supplied, the power which is supplied to the rectifier circuit 100 can be divided. Further, the threshold voltage of the first transistor 201 in the rectifier circuit 100 is reduced, so that the rectification operation is not performed in the first transistor 201. Therefore, the DC voltage $V_{DC}$ can be prevented from increasing.

With the structure of this embodiment mode, the threshold voltage of a transistor provided in the rectifier circuit is controlled so that an excess voltage is not applied to an internal circuit even in the case where the communication distance of the semiconductor device which can communicate within a given communication distance is changed and thus a high frequency signal strong enough to break an element is supplied to a circuit. Therefore, a semiconductor device of which an element included in each internal circuit can normally operate without being deteriorated or broken can be provided.

Embodiment Mode 3

In this embodiment mode, another structure of the power source portion of Embodiment Mode 1, which is shown in FIG. 1, is described. Note that the rectifier circuit 100 having the same configuration as in Embodiment Mode 2 and thus description in Embodiment Mode 2 is used supportively, and the configuration of each circuit other than the rectifier circuit 100 is the same as that of Embodiment Mode 1 and thus description in Embodiment Mode 1 is used supportively.

In this embodiment mode, the circuit configuration of the power source portion in the semiconductor device of the present invention will be described with reference to FIG. 8.

Figure 8:
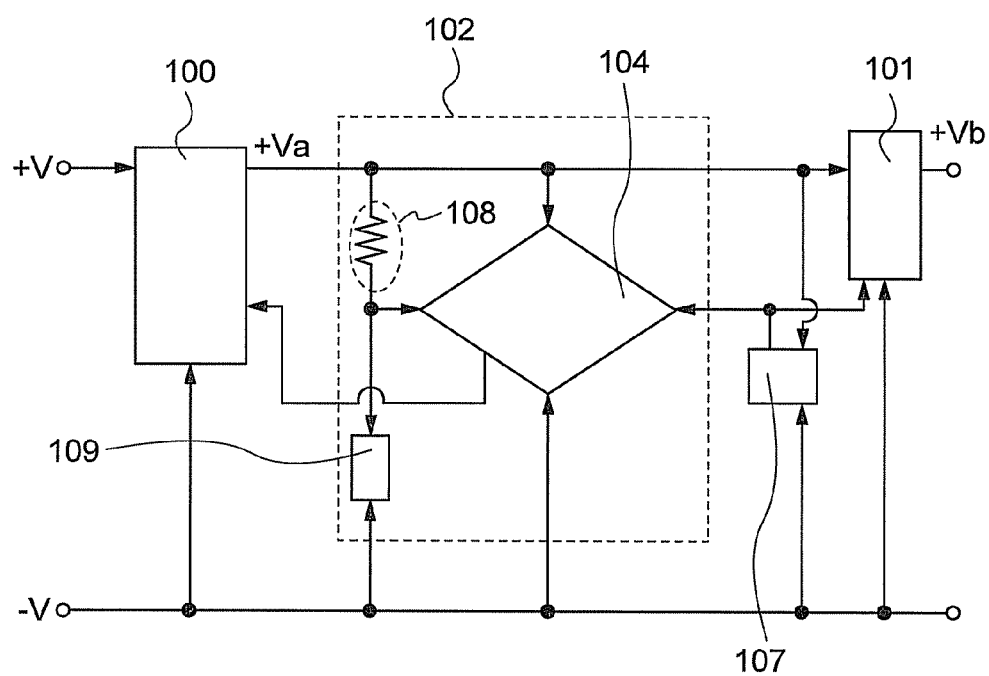
FIG. 8 is a block diagram showing a power source portion of Embodiment Mode 3.

As shown in FIG. 8, the power source portion includes the rectifier circuit 100, the power supply circuit 101, the comparing portion 102, and the bias circuit 107. The rectifier circuit 100 rectifies and smoothes a signal inputted from a +V terminal which is a signal input terminal and thus generates a DC voltage $V_{DC}$ which is a first DC voltage and outputs the DC voltage $V_{DC}$ to a +Va terminal. The power supply circuit 101 makes a DC voltage $V_{DC}$ which is inputted from the +Va terminal be a constant voltage and thus generates a power supply voltage and outputs the power supply voltage to a +Vb terminal. The bias circuit 107 generates a reference voltage $V_{\_BIAS}$ from the DC voltage $V_{DC}$ which is inputted from the +Va terminal and outputs the reference voltage $V_{\_BIAS}$ to the power supply circuit 101 and the comparing portion 102. It is to be noted that in the case where the reference voltage $V_{\_BIAS}$ is generated in the power supply circuit 101 or in the case where the reference voltage $V_{\_BIAS}$ is not necessary, it is allowed that the reference voltage $V_{\_BIAS}$ is not outputted to the power supply circuit 101 from the bias circuit 107. The comparing portion 102 includes the comparing circuit 104, a resistor 108, and a transistor group 109. The resistor 108 and the transistor group 109 generate a DC voltage $V_{DC'}$ based on a DC voltage $V_{DC}$ generated in the rectifier circuit 100 and output the DC voltage $V_{DC'}$ to the comparing circuit 104. While the transistor group 109 is used to generate the DC voltage $V_{DC'}$ here, a resistor can be substituted for the transistor group 109. The comparing circuit 104 compares the levels of the DC voltage $V_{DC'}$ and the reference voltage $V_{\_BIAS}$ and outputs the comparison result to the rectifier circuit 100 as the DC voltage $V_{SUB}$.

Although not shown in FIG. 8, in the semiconductor device to which a signal is supplied from the antenna, the +terminal of the antenna is connected to the +V terminal and the −terminal of the antenna is connected to the −V terminal.

The configuration of each circuit is the same as that of any of Embodiment Modes 1 and 2 and thus description in Embodiment Modes 1 and 2 is used supportively.

Next, the operation of the power source portion of this embodiment mode will be described.

A signal which is received from the antenna is inputted to the +V and −V terminals.

Note that in this embodiment mode, an operation with respect to the signal of the +V terminal which is constant based on the signal of the −V terminal is described for simplification. In practice, in the case of the semiconductor device to which a signal is supplied from the antenna, such as a wireless tag, an input signal may be mainly a differential signal; however, this embodiment mode can adapt even when an input signal is a differential signal because a difference is only whether a reference signal is constant or not.

The operation of the power source portion in this embodiment mode is described with reference to FIGS. 6 and 8. It is different from that of the power source portion in Embodiment Mode 2 in that the DC voltage $V_{SUB}$ of the rectifier circuit 100 is generated in the comparing circuit 104 instead of in the substrate voltage generation circuit 105. In this embodiment mode, the comparing circuit 104 inputs the signal for turning the switch 106 on or off in Embodiment Modes 1 and 2 to the rectifier circuit 100 as the DC voltage $V_{SUB}$.

First, the operation in the case where power which is supplied from the antenna is appropriate is described. As described above, the operation corresponds to that in the case where the value of the DC voltage $V_{DC}$ which is an output of the rectifier circuit 100 is small enough that all transistors of the transistor group 401 are off. In that case, the first transistor 402 is off because of the relation between the DC voltage $V_{DC}$ and the DC voltage $V_{DC'}$, and thus the node q is at the same voltage as the −V terminal and the potential of the node q is outputted to the rectifier circuit 100 as the DC voltage $V_{SUB}$ which is the second DC voltage. When the DC voltage $V_{SUB}$ is a potential equal to or approximately equal to that of the −V terminal, the threshold voltage of the transistor included in the rectifier circuit 100 does not change and therefore the DC voltage $V_{DC}$ which is an output voltage does not change from a certain value, in the rectifier circuit 100 to which a certain input voltage $V_{IN}$ is inputted.

While, the operation in the case where the value of the DC voltage $V_{DC}$ is small enough that all transistors of the transistor group 401 are off is described. As described above, the operation corresponds to that in the case where the value of the DC voltage $V_{DC}$ which is an output of the rectifier circuit 100 is large enough that all transistors of the transistor group

401 are on. In that case, the DC voltage $V_{DC'}$ is lower than the DC voltage $V_{DC}$ because of the transistor group 401 and the resistor 404, and thus the first transistor 402 is turned on. The higher the DC voltage $V_{DC}$ is, the larger the potential difference between the DC voltage $V_{DC}$ and the $V_{DC'}$ to be generated is. Accordingly, the amount of current of the first transistor 402 increases. The potential of the node q varies depending on the amount of current of the first transistor 402 and the second transistor 403. When the amount of current of the second transistor 403 is large, the potential of the node q is equal to or approximately equal to that of the −V terminal, whereas in the reverse case, the potential of the node q is increased. Thus, the potential of the node q varies depending on the level of the DC voltage $V_{DC}$. The potential of the node q is outputted to the rectifier circuit as the DC voltage $V_{SUB}$.

When a potential higher than that of the −V terminal is inputted to the DC voltage $V_{SUB}$ of the rectifier circuit 100 from the comparing circuit 104, the substrate voltage of the first transistor 211 is increased, and thus the threshold voltage $V_{th}$ of the first transistor 211 is reduced. When the threshold voltage $V_{th}$ of the first transistor 211 is less than 0, the first transistor 211 cannot be turned off and is constantly on, so that a current flows constantly. Thus, the first transistor 211 loses the rectification function and can be regarded as a resistor. The rectifier circuit 100 cannot achieve voltage doubling and operates as a half-wave rectifier circuit. When the output voltage of a half-wave rectifier circuit is the DC voltage $V_{DC}$, Formula 4 is satisfied.

Therefore, it can be found that the DC voltage $V_{DC}$ is also reduced as the threshold voltage $V_{th}$ of the first transistor 201 is extremely lower than the normal voltage (a voltage when supplied power is appropriate) in the rectifier circuit 100.

Note that as the rectifier circuit 100, a half-wave voltage quadrupler rectifier circuit, a half-wave voltage sextupler rectifier circuit, or an all-wave rectifier circuit may be used.

As described above, in the case where a high frequency signal strong enough to break an element is supplied to the rectifier circuit 100, the threshold voltage of the first transistor 201 in the rectifier circuit 100 is reduced so that the rectification operation is not performed in the first transistor 201. Therefore, the DC voltage $V_{DC}$ can be prevented from increasing.

With the structure of this embodiment mode, the threshold voltage of a transistor provided in the rectifier circuit is controlled so that an excess voltage is not applied to a circuit of the semiconductor device in the semiconductor device which can communicate within a given communication distance, even in the case where while the communication distance of the semiconductor device is changed, a high frequency signal strong enough to break an element is inputted to a circuit. Therefore, the semiconductor device of which an element included in a circuit of the semiconductor device can normally operate without being deteriorated or broken can be provided.

Embodiment Mode 4

In this embodiment mode, another structure of the power source portion of Embodiment Mode 3, which is shown in FIG. 8, is described. Note that as the comparing portion 102 having the structure, the circuit of the above embodiment mode, which is transformed, is used and the rectifier circuit 100 has the same configuration as in Embodiment Mode 2 and thus description in Embodiment Mode 2 is used supportively.

In this embodiment mode, the circuit configuration of the power source portion in the semiconductor device of the present invention will be described with reference to FIG. 9.

Figure 9:
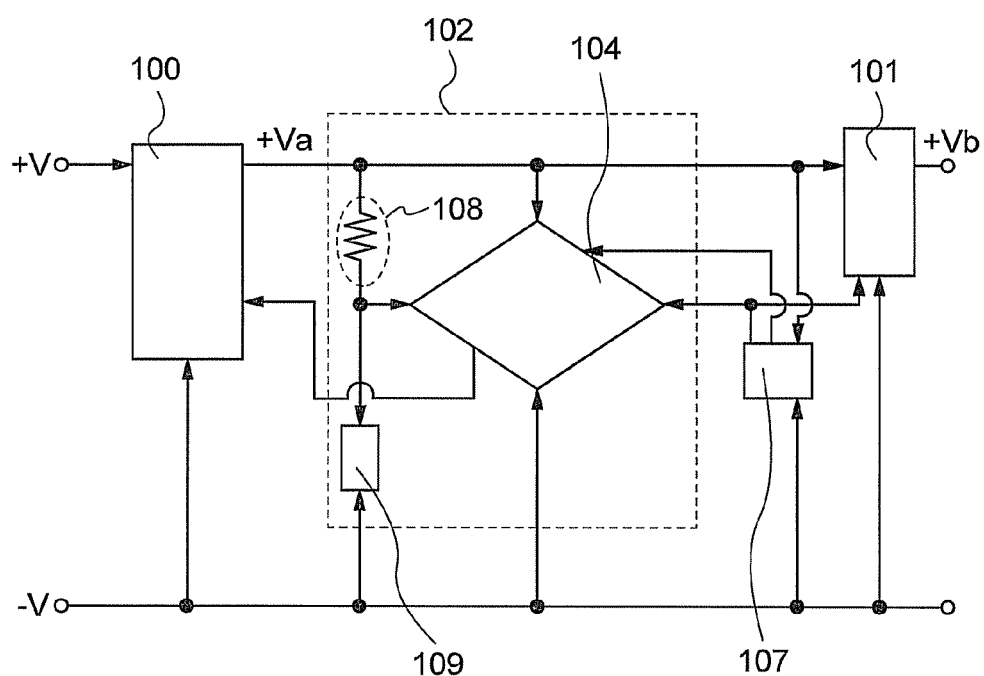
FIG. 9 is a block diagram showing a power source portion of Embodiment Mode 4.

As shown in FIG. 9, the power source portion includes the rectifier circuit 100, the power supply circuit 101, the comparing portion 102, and the bias circuit 107. The rectifier circuit 100 rectifies and smoothes a signal inputted from a+V terminal which is a signal input terminal and thus generates a DC voltage $V_{DC}$ which is a first DC voltage and outputs the DC voltage $V_{DC}$ to a+Va terminal. The power supply circuit 101 makes a DC voltage $V_{DC}$ which is inputted from the +Va terminal be a constant voltage and thus generates a power supply voltage and outputs the power supply voltage to a +Vb terminal. The bias circuit 107 generates a reference voltage $V_{-BIAS}$ from the DC voltage $V_{DC}$ which is inputted from the +Va terminal and outputs the reference voltage $V_{-BIAS}$ to the power supply circuit 101 and the comparing portion 102. Similarly, the bias circuit 107 generates a reference voltage $V_{-BIAS'}$ from the DC voltage $V_{DC}$ which is inputted from the +Va terminal and outputs the reference voltage $V_{-BIAS'}$ to the comparing portion 102. It is to be noted that in the case where the reference voltage $V_{-BIAS}$ is generated in the power supply circuit 101 or in the case where the reference voltage $V_{-BIAS}$ is not necessary, it is allowed that the reference voltage $V_{-BIAS}$ is not outputted to the power supply circuit 101 from the bias circuit 107. The comparing portion 102 includes a comparing circuit 104, a resistor 108, and a transistor group 109. The resistor 108 and the transistor group 109 generate a DC voltage $V_{DC'}$ based on the DC voltage $V_{DC}$ generated in the rectifier circuit 100 and output the DC voltage $V_{DC'}$ to the comparing circuit 104. While the transistor group 109 is used to generate the DC voltage $V_{DC'}$ here, a resistor can be substituted for the transistor group 109. The comparing circuit 104 compares the levels of the DC voltage $V_{DC'}$ and the reference voltage $V_{-BIAS}$ and outputs the comparison result to the rectifier circuit 100 as a DC voltage $V_{SUB}$.

Although not shown in FIG. 9, in the semiconductor device to which a signal is supplied from the antenna, the +terminal of the antenna is connected to the +V terminal and the −terminal of the antenna is connected to the −V terminal.

The configuration of each circuit other than the comparing portion 102 is the same as that of the above embodiment mode and thus description in the above embodiment mode is used supportively.

Figure 10:
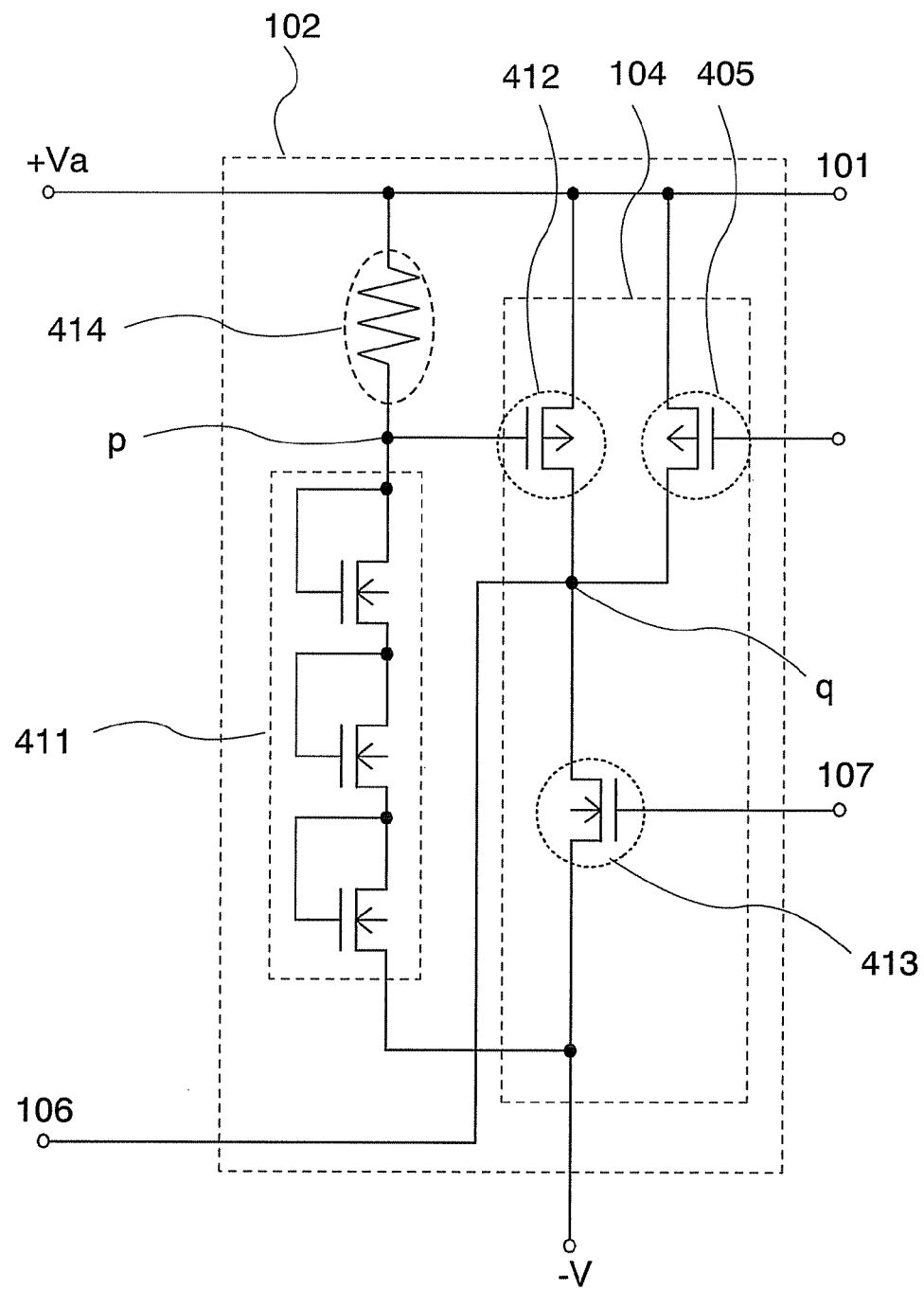
FIG. 10 is a block diagram showing a comparing circuit of Embodiment Mode 4.

The configuration of the comparing portion 102 is described with reference to FIG. 10. The comparing portion 102 in this embodiment mode differs from that in any of Embodiment Modes 1 to 3 in that a third transistor 405 which is connected in parallel with a first transistor 412 is additionally provided. Here, the third transistor 405 is a p-channel transistor. One of a source terminal and a drain terminal of the third transistor 405 is connected to the other of a source terminal and a drain terminal of the first transistor 412 and one end of a resistor 414. Further, the other of the source terminal and the drain terminal of the third transistor 405 is connected to one of the source terminal and the drain terminal of the first transistor 412 and one of a source terminal and a drain terminal of a second transistor 413. The connection point is the node q. A gate terminal of the third transistor 405 is connected to a bias circuit 107, and $V_{-BIAS'}$ is inputted from the gate terminal of the third transistor 405.

Next, the operation of the power source portion of this embodiment mode will be described.

A signal which is received from the antenna is inputted to the +V and −V terminals.

Note that in this embodiment mode, an operation with respect to the signal of the +V terminal when the signal of the −V terminal is a reference signal which is constant is described for simplification. In the case of the semiconductor device to which a signal is supplied from the antenna, an input signal may be mainly a differential signal; however, this embodiment mode can adapt even when an input signal is a differential signal because a difference is only whether a reference signal is constant or not.

The operation of the power source portion in this embodiment mode is described with reference to FIGS. 9 and 10. It is different from that in Embodiment Mode 3 in that the reference voltage $V_{\_BIAS}$ which has two different potentials for the comparing portion 102 is generated in the bias circuit 107, and either potential of $V_{\_BIAS}$ is outputted to the comparing portion 102.

First, the operation in the case where power which is supplied from the antenna is appropriate is described. As described above, the operation corresponds to that in the case where the value of the DC voltage $V_{DC}$ which is an output of the rectifier circuit 100 is small enough that all transistors of the transistor group 411 are off. In that case, the first transistor 412 is off because of the relation between the DC voltage $V_{DC}$ and the DC voltage $V_{DC'}$.

However, since a certain reference voltage $V_{\_BIAS'}$ is constantly inputted to the third transistor 405 from the bias circuit 107, a certain current constantly flows through the third transistor 405. When the amount of current is smaller than that flowing through the second transistor 413, the node q is at an approximately equal potential to the −V terminal, whereas when the amount of current is larger than that flowing through the second transistor 413, the node q is at a higher potential than the −V terminal. By adjusting the potential, the substrate potential $V_{SUB}$ which is the second DC voltage of the first transistor 211 of the rectifier circuit 100 can be set to adjust the threshold voltage of the first transistor 211 when power supplied from the antenna is appropriate. As described above, the rectifier circuit 100 can generate a high DC voltage $V_{DC}$ when the threshold voltage $V_{th}$ of a transistor included in the rectifier circuit 100 is low; therefore, by adjusting the reference voltage $V_{\_BIAS'}$, the DC voltage $V_{DC}$ which is an output of the rectifier circuit 100 can be increased.

While, the operation in the case where the value of the DC voltage $V_{DC}$ is large enough that all transistors of the transistor group 411 are on is described. As described above, the operation corresponds to that in the case where the value of the DC voltage $V_{DC}$ which is an output of the rectifier circuit 100 is large enough that all transistors of the transistor group 411 are on. In that case, the DC voltage $V_{DC}$ is lower than the DC voltage $V_{DC}$ because of the transistor group 411 and the resistor 414, and thus the first transistor 412 is turned on. The higher the DC voltage $V_{DC}$ is, the larger the potential difference between the DC voltage $V_{DC}$ and the $V_{DC}$ to be generated is. Accordingly, the amount of current of the first transistor 412 increases. The potential of the node q varies depending on the difference between the amount of current of the second transistor 413 and the sum of the amount of current of the first transistor 412 and the amount of current of the third transistor 405. When the amount of current of the second transistor 413 is larger than the sum of the amount of current of the first transistor 412 and the amount of current of the third transistor 405, the potential of the node q is approximately equal to that of the −V terminal, whereas in the reverse case, the potential of the node q is increased. Thus, the potential of the node q varies depending on the level of the DC voltage $V_{DC}$. The potential of the node q is outputted to the rectifier circuit 100 as a DC voltage $V_{SUB}$.

When a potential higher than that of the −V terminal is inputted to the DC voltage $V_{SUB}$ of the rectifier circuit 100 from the comparing circuit 104, the substrate voltage of the first transistor 211 is increased, and thus the threshold voltage $V_{th}$ of the first transistor 211 is reduced. When the threshold voltage $V_{th}$ of the first transistor 211 is less than 0, the first transistor 211 cannot be turned off and is constantly on, so that a current flows constantly. Thus, the first transistor 211 loses the rectification function and performs only the operation of the resistor. The rectifier circuit 100 cannot achieve voltage doubling and operates as a half-wave rectifier circuit. When the output voltage of a half-wave rectifier circuit is the DC voltage $V_{DC}$, Formula 4 is satisfied.

Therefore, the DC voltage $V_{DC}$ is also reduced as the threshold voltage $V_{th}$ of the first transistor 201 is lower than the normal voltage in the rectifier circuit 100.

Note that as the rectifier circuit 100, a half-wave voltage quadrupler rectifier circuit, a half-wave voltage sextupler rectifier circuit, or an all-wave rectifier circuit may be used.

As described above, in the case where a high frequency signal strong enough to break an element is supplied, the threshold voltages of the first transistor 201 in the rectifier circuit 100 is reduced so that the rectification operation is not performed in the first transistor 201. Therefore, the DC voltage $V_{DC}$ can be prevented from increasing.

In the semiconductor device, the rectifier circuit 100 generates a high voltage from a weak received signal so that communication distance is extended, so the threshold voltage is set low. On the other hand, in a logic circuit, a standby current consumption increases as the threshold voltage is reduced, so the threshold voltage is set high. With the circuit configuration of this embodiment mode, the rectifier circuit 100 can set the threshold voltage at an optimal value even if all transistors are manufactured in accordance with the threshold voltage of the logic circuit; therefore, a wireless tag which has lower power consumption and operates with weak power can be manufactured.

With the structure of this embodiment mode, the threshold voltage of a transistor provided in the rectifier circuit is controlled so that an excess voltage is not applied to an internal circuit even in the case where the communication distance of the semiconductor device which can communicate within a given communication distance is changed and thus a signal strong enough to break an element is supplied to a circuit. Therefore, a semiconductor device of which an element included in each internal circuit can normally operate without being deteriorated or broken can be provided.

Embodiment Mode 5

In this embodiment mode, another structure of the power source portion of Embodiment Mode 1, which is shown in FIG. 1, is described.

In this embodiment mode, the circuit configuration of the power source portion in the semiconductor device of the present invention will be described with reference to FIG. 11.

Figure 11:
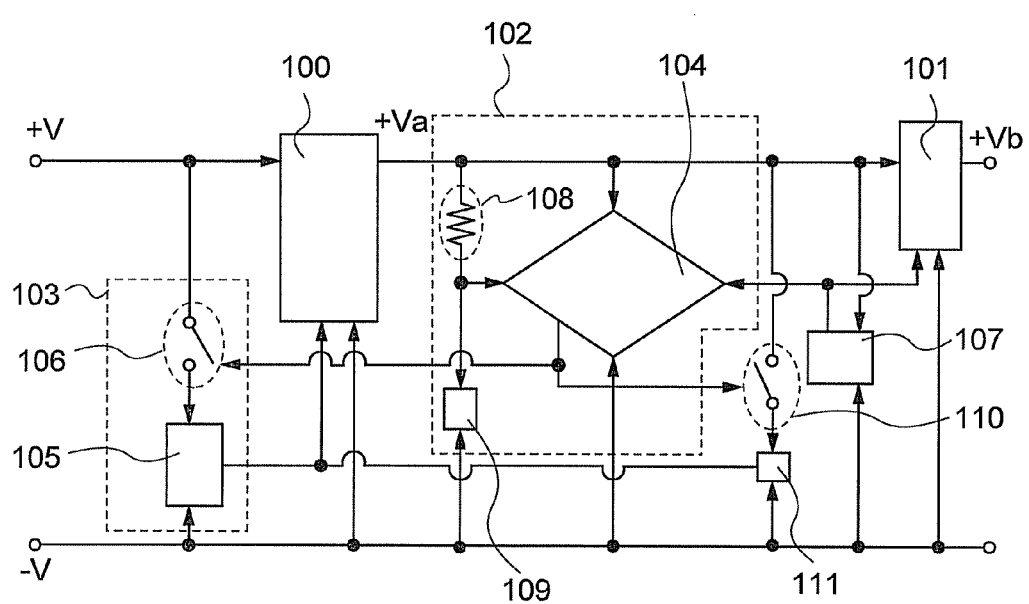
FIG. 11 is a block diagram showing a comparing circuit of Embodiment Mode 5.

As shown in FIG. 11, the power source portion includes the rectifier circuit 100, the power supply circuit 101, the comparing portion 102, the substrate voltage generation portion 103, a first bias circuit 107, a second bias circuit 111, and a switch 110. The rectifier circuit 100 rectifies and smoothes a signal inputted from the +V terminal which is a signal input terminal and thus generates a DC voltage $V_{DC}$ which is a first DC voltage and outputs the DC voltage $V_{DC}$ to the +Va terminal.

Note that the configuration of each circuit other than the second bias circuit 111 and the switch 110 is the same as that of Embodiment Mode 1 and thus description in Embodiment Mode 1 is used supportively.

The second bias circuit 111 can have a similar circuit configuration to the first bias circuit 107.

The power supply circuit 101 makes a DC voltage $V_{DC}$ which is inputted from the +Va terminal be a constant voltage and thus generates a power supply voltage and outputs the power supply voltage to a +Vb terminal.

The first bias circuit 107 generates a reference voltage $V_{\_BIAS}$ from the DC voltage $V_{DC}$ which is inputted from the +Va terminal and outputs the reference voltage $V_{\_BIAS}$ to the power supply circuit 101 and the comparing portion 102. It is to be noted that in a case where the reference voltage $V_{\_BIAS}$ is generated in the power supply circuit 101 or in a case where the reference voltage $V_{\_BIAS}$ is not necessary, it is allowed that the reference voltage $V_{\_BIAS}$ is not outputted to the power supply circuit 101 from the first bias circuit 107.

The switch 110 selects on or off of the +Va terminal and the second bias circuit 111 in accordance with a signal including information about the result of the comparing circuit 104.

When the switch 110 is on, the second bias circuit 111 generates a reference voltage $V_{\_BIAS'}$ which is a third DC voltage from the DC voltage $V_{DC}$ which is inputted from the +Va terminal and outputs the reference voltage $V_{\_BIAS'}$ as a DC voltage $V_{SUB}$ of the rectifier circuit 100. While, when the switch 110 is off, the DC voltage $V_{DC}$ is not supplied to the second bias circuit 111 and thus the second bias circuit 111 does not operate.

The comparing portion 102 includes the comparing circuit 104, the resistor 108, and the transistor group 109. The resistor 108 and the transistor group 109 generate a DC voltage $V_{DC'}$ based on a DC voltage $V_{DC}$ generated in the rectifier circuit 100 and output the DC voltage $V_{DC'}$ to the comparing circuit 104. While the transistor group 109 is used to generate the DC voltage $V_{DC'}$ here, a resistor can be substituted for the transistor group 109. The comparing circuit 104 compares the levels of the DC voltage $V_{DC'}$ and the reference voltage $V_{\_BIAS}$ and outputs the comparison result to the substrate voltage generation portion 103.

The substrate voltage generation portion 103 includes the substrate voltage generation circuit 105 and the switch 106. On or off of the switch 106 is selected in accordance with the signal including information about the result of the comparing circuit 104 so that connection or disconnection between the +V terminal and the substrate voltage generation circuit 105 is selected. When the switch 106 is on, the substrate voltage generation circuit 105 is connected to the +V terminal and a signal is inputted to the substrate voltage generation circuit 105 from the +V terminal. The substrate voltage generation circuit 105 rectifies and smoothes the signal inputted from the +V terminal and thus generates a DC voltage $V_{SUB}$ which is a second DC voltage and outputs the DC voltage $V_{SUB}$ to the rectifier circuit 100. When the switch 106 is off, the substrate voltage generation circuit 105 outputs a potential equal to that of the –V terminal to the rectifier circuit 100.

Although not shown in FIG. 11, in the semiconductor device to which a signal is supplied from the antenna, such as a wireless tag, the +terminal of the antenna is connected to the +V terminal and the –terminal of the antenna is connected to the –V terminal.

The configuration of each circuit is the same as that of Embodiment Mode 1 and thus description in Embodiment Mode 1 is used supportively.

Next, the operation of the power source portion of this embodiment mode will be described.

A signal which is received from the antenna is inputted to the +V and –V terminals.

Note that in this embodiment mode, an operation with respect to the signal of the +V terminal which is constant based on the signal of the –V terminal is described for simplification. In practice, in the case of the semiconductor device to which a signal is supplied from the antenna, such as a wireless tag, an input signal may be mainly a differential signal; however, this embodiment mode can adapt even when an input signal is a differential signal because a difference is only whether a reference signal is constant or not.

The operation of the power source portion in this embodiment mode is described with reference to FIG. 11. It is different from that of the power source portion in Embodiment Mode 1 in that two bias circuits are provided and a switch is additionally provided. The reference voltage $V_{\_BIAS}$ is outputted to the comparing portion 102 from the first bias circuit 107, and a reference voltage $V_{\_BIAS'}$ is outputted as the DC voltage $V_{SUB}$ to the rectifier circuit 100 from the second bias circuit 111. The switch 110 is connected between the +Va terminal and the second bias circuit 111 to select connection or disconnection between the +Va terminal and the second bias circuit 111. Here, it is assumed that the switch 110 is a p-channel transistor.

First, the operation in the case where power which is supplied from the antenna is appropriate is described. As described above, the operation corresponds to that in the case where the value of the DC voltage $V_{DC}$ which is an output of the rectifier circuit 100 is small enough that all transistors of the transistor group 401 are off. In that case, a potential approximately equal to that of the –V terminal is outputted to the switch 106 and the switch 110 from the comparing circuit 104 and thus the switch 106 is turned off and the switch 110 is turned on. Therefore, the substrate voltage generation circuit 105 outputs a potential equal to that of the –V terminal as the DC voltage $V_{SUB}$ of the rectifier circuit 100, and the second bias circuit 111 operates and outputs the reference voltage $V_{\_BIAS'}$ as the DC voltage $V_{SUB}$ of the rectifier circuit 100. Here, the resistor 305 of the substrate voltage generation circuit 105 has a resistance value large enough not to affect substrate voltage generation, and thus the potential of the DC voltage $V_{SUB}$ to be generated is determined by the potential of the reference voltage $V_{\_BIAS'}$ which has been inputted.

When the reference voltage $V_{\_BIAS'}$ is inputted as the DC voltage $V_{SUB}$ to the rectifier circuit 100 from the second bias circuit 111, the substrate voltage of the first transistor 201 and the second transistor 202 is increased, so the threshold voltage $V_{th}$ is reduced. By adjusting the potential of the reference voltage $V_{\_BIAS'}$, the DC voltage $V_{SUB}$ of the first transistor 211 of the rectifier circuit 100 can be set to adjust the threshold voltage even in the case where power supplied from the antenna is appropriate. The rectifier circuit 100 can generate the high DC voltage $V_{DC}$ if the threshold voltage $V_{DC}$ of the transistor is low as expressed by Formula 1; therefore, by adjusting the reference voltage $V_{\_BIAS'}$, the DC voltage $V_{DC}$ which is an output of the rectifier circuit 100 can be increased.

While, the operation in the case where the value of the DC voltage $V_{DC}$ is large enough that all transistors of the transistor group 401 are on is described. As described above, the operation corresponds to that in the case where the value of the DC voltage $V_{DC}$ which is an output of the rectifier circuit 100 is large enough that all transistors of the transistor group 401 are on. In that case, an output potential of the comparing circuit 104 is higher than that of the –V terminal and thus the switch 106 is turned on and the switch 110 is turned off. Therefore, the substrate voltage generation circuit 105 outputs a potential lower than that of the –V terminal as the DC voltage $V_{SUB}$ of the rectifier circuit 100, and the second bias circuit 111 does not operate. Thus, the DC voltage $V_{SUB}$ is determined by the potential of an output of the substrate voltage generation circuit 105.

When the DC voltage $V_{SUB}$ is inputted to the rectifier circuit 100, the substrate voltages of the first transistor 201 and the second transistor 202 in the rectifier circuit 100 are lower than a normal voltage (a voltage when supplied power is appropriate), so the threshold voltage $V_{th}$ of the first transistor 201 and the second transistor 202 is increased. Since the relation between the threshold voltage $V_{th}$ and the DC voltage $V_{DC}$ which is an output of the rectifier circuit 100 is as expressed by Formula 1, the higher the threshold voltages $V_{th}$ of the first transistor 201 and the second transistor 202 are, the lower the DC voltage $V_{DC}$ is.

Therefore, the DC voltage $V_{DC}$ is reduced as the threshold voltages $V_{th}$ of the first transistor 201 and the second transistor 202 are higher than the normal voltage in the rectifier circuit 100.

Note that as the rectifier circuit 100, a half-wave voltage quadrupler rectifier circuit, a half-wave voltage sextupler rectifier circuit, or an all-wave rectifier circuit may be used.

As described above, in the case where a high frequency signal strong enough to break an element is supplied, the threshold voltage of the first transistor 201 in the rectifier circuit 100 is reduced so that the rectification operation is not performed in the first transistor 201. Therefore, the DC voltage $V_{DC}$ can be prevented from increasing.

In the semiconductor device, the rectifier circuit 100 generates a high voltage from weak received power so that communication distance is extended, so the threshold voltage is set low. On the other hand, in a logic circuit, a standby current consumption increases as the threshold voltage is reduced, so the threshold voltage is set high. With the circuit configuration of this embodiment mode, the rectifier circuit 100 can set the threshold voltage at an optimal value even if a transistor is manufactured in accordance with the threshold voltage of the logic circuit; therefore, a semiconductor device which has lower power consumption and operates with weak power can be manufactured.

With the structure of this embodiment mode, the threshold voltage of a transistor provided in the rectifier circuit is controlled so that an excess voltage is not applied to an internal circuit even in the case where the communication distance of the semiconductor device which can communicate within a given communication distance is changed and thus a signal strong enough to break an element is supplied to a circuit. Therefore, a semiconductor device of which an element included in each internal circuit can normally operate without being deteriorated or broken can be provided.

Embodiment Mode 6

Figure 12:
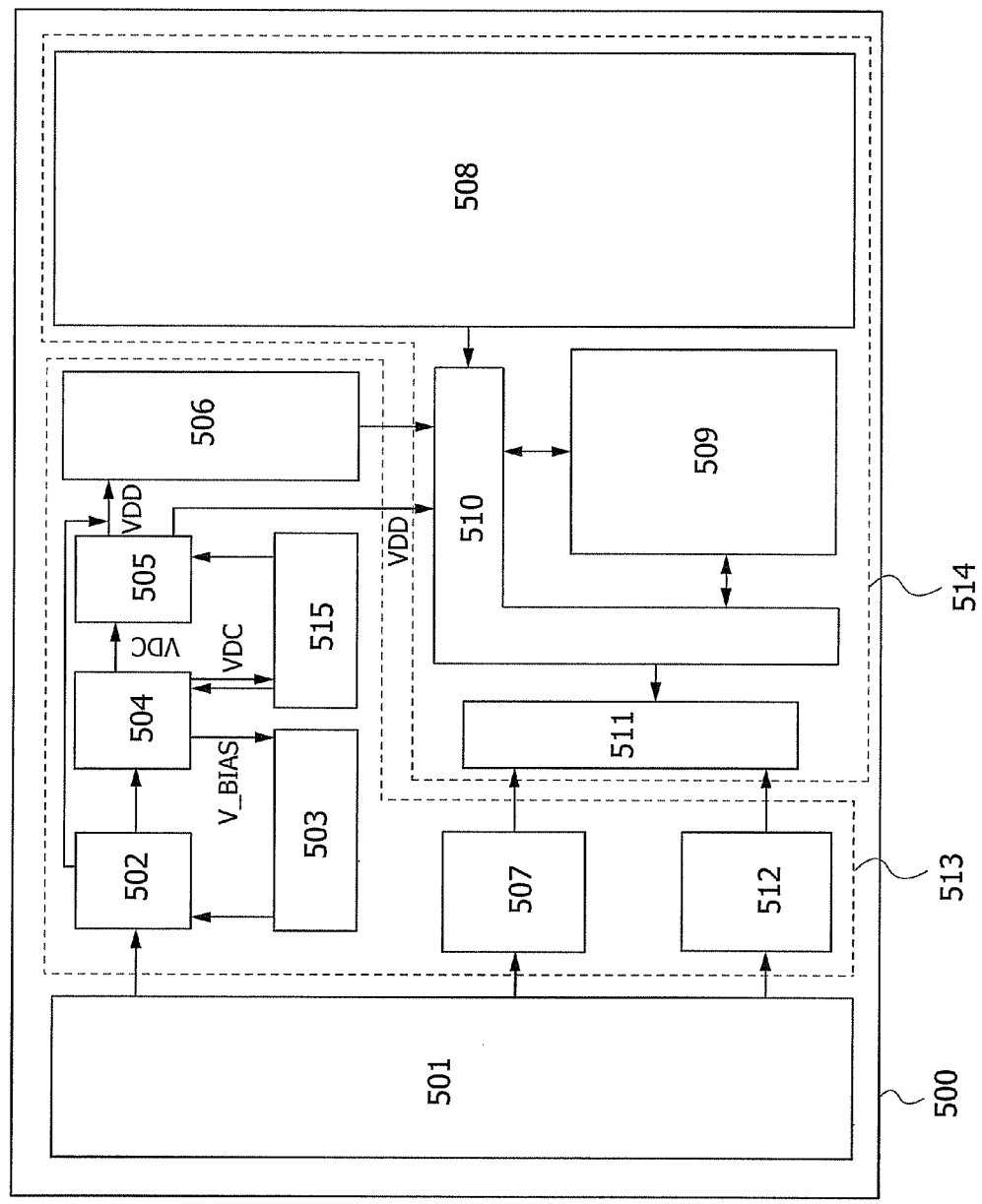
FIG. 12 is a block diagram of a semiconductor device of the present invention.

In this embodiment mode, the semiconductor device including a rectifier circuit of the present invention is described with reference to FIG. 12.

The semiconductor device 500 of the present invention includes an antenna 501 for receiving a signal from a wireless communication device, an input circuit portion 513, and a logic circuit portion 514. Note that although the antenna 501 can be formed separately from a chip body including the input circuit portion 513 and the logic circuit portion 514 and connected to the chip body in another step to form the semiconductor device 500, the antenna 501 and the chip body are preferably formed in the same step.

The input circuit portion 513 of the semiconductor device 500 includes a rectifier circuit 502 for converting an AC signal received from the antenna 501 into a DC signal; a substrate voltage generation portion 503 for generating the substrate voltage of a transistor in the rectifier circuit 502; a comparing portion 504 for controlling to operate the substrate voltage generation portion 503; a bias circuit 515 for generating a reference voltage; a power supply circuit 505 for supplying a stable voltage to an internal circuit; a clock generation circuit portion 506 for generating a clock to be supplied to the internal circuit; a demodulation circuit portion 507 for demodulating data received from the antenna 501 into a digital signal; and a modulation circuit portion 512 for modulating the encoded data.

The logic circuit portion 514 of the semiconductor device 500 includes an instruction analysis portion for analyzing data demodulated in the demodulation circuit portion 507; a determination circuit portion 508 for determining whether the demodulated data is normally received; a memory 509; a controller circuit portion 510 for controlling the memory 509; and an encoding circuit 511 for encoding data. Here, a transistor included in each circuit may include a substrate terminal. In a semiconductor device to which a wireless signal is supplied, current consumption of the logic circuit portion 514 becomes a problem because when the rectifier circuit 502 generates a high DC voltage $V_{DC}$ from weak received power, the threshold voltage of a transistor is set low. By providing a substrate terminal for each transistor, the threshold voltage of each transistor can be controlled and thus current consumption can be reduced.

In this embodiment mode, the signal encoded in the encoding circuit portion 511 is inputted to the modulation circuit portion 512 and the modulation circuit portion 512 performs load modulation. The demodulation circuit portion 507 demodulates a radio wave inputted from a +V terminal. A demodulated signal output terminal is connected to the clock generation circuit portion 506 and a decoding circuit portion in the logic circuit portion 514. The DC voltage $V_{DC}$ rectified and smoothed in the rectifier circuit 502 is inputted to the power supply circuit 505 and the power supply circuit 505 outputs a power supply voltage $V_{DD}$ generated from the DC voltage $V_{DC}$ to the clock generation circuit portion 506 and the controller circuit portion 510. A +Va terminal is connected to the clock generation circuit portion 506 and the logic circuit portion 514 and supplies power to each circuit. The clock generation circuit portion 506 outputs a reference clock. An output terminal of the clock generation circuit portion 506 is connected to the logic circuit portion 514 and supplies a clock to each circuit in the logic circuit portion 514.

With a structure in which the input circuit portion of this embodiment mode is provided with the rectifier circuit of the above embodiment mode, a substrate voltage is generated in the substrate voltage generation portion 503 in accordance with the output of the comparing portion 504 and the threshold voltage of a transistor in the rectifier circuit 502 can be controlled by the substrate voltage, in the semiconductor device which can communicate within a given communication distance, even in the case where, for example, while the communication distance of the semiconductor device is changed, a high frequency signal strong enough to break an element is inputted to a circuit. Therefore, the rectifier circuit 502 can perform rectification and smoothing to prevent the generated DC voltage $V_{DC}$ from excessively increasing and can output the DC voltage $V_{DC}$ to the power supply circuit 505.

With the structure of this embodiment mode, the threshold voltage of a transistor provided in the rectifier circuit is controlled so that an excess voltage is not applied to an input circuit, in the semiconductor device which can communicate within a given communication distance, even in the case where, for example, while the communication distance of the semiconductor device is changed, a high frequency signal strong enough to break an element is inputted to a circuit. Therefore, a semiconductor device of which an element included in the input circuit is not deteriorated or broken and of which the other circuits can normally operate can be provided.

Note that this embodiment mode can be combined with any of the other embodiment modes as appropriate.

Embodiment Mode 7

In this embodiment mode, a transistor including a non-single crystal semiconductor film is described as an example of a transistor which can be used in the rectifier circuit in the present invention.

Figure 13:
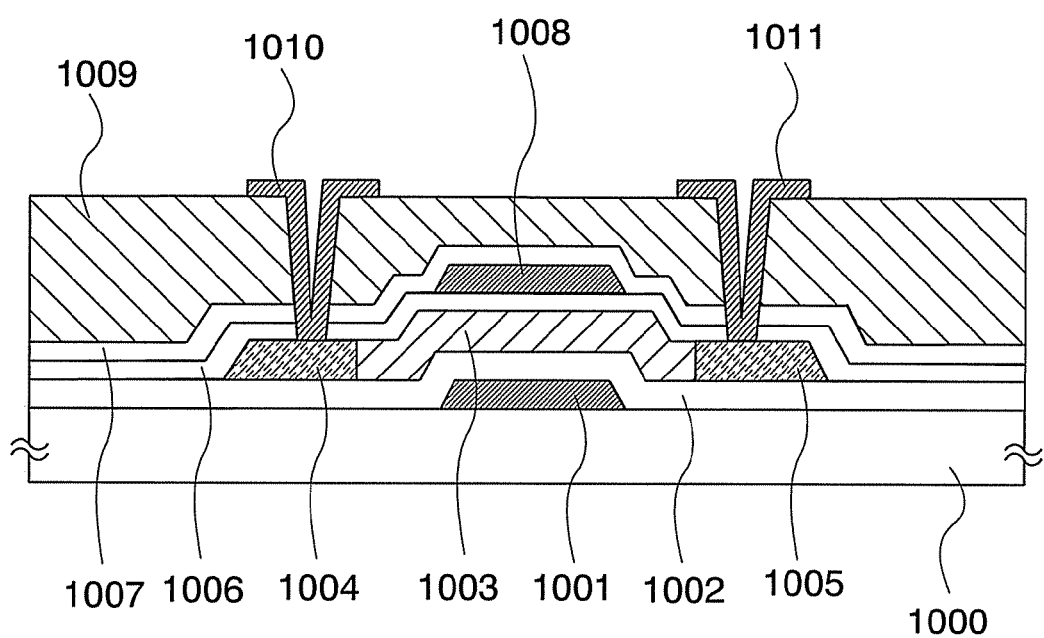
FIG. 13 is a cross-sectional view showing a transistor, which can be used for a rectifier circuit mounted on a semiconductor device of the present invention, in Embodiment Mode 7.

FIG. 13 shows the transistor of this embodiment mode. The transistor of this embodiment mode includes a first gate electrode 1001 over a substrate 1000; a first insulating layer 1002 over the first gate electrode 1001; a semiconductor layer 1003 over the first insulating layer 1002; a second insulating layer 1006 over the semiconductor layer 1003; a second gate electrode 1008 over the second insulating layer 1006; and a third insulating layer 1007 over the second gate electrode 1008. The semiconductor layer 1003 includes an impurity region 1004, an impurity region 1005, and a channel formation region between the impurity region 1004 and the impurity region 1005. The transistor of this embodiment mode further includes a fourth insulating layer 1009 over the third insulating layer 1007 and the gate electrode 1008; a given number of contact portions in part of the fourth insulating layer 1009; and a wiring 1010 and a wiring 1011 which are provided over the impurity region 1004 and the impurity region 1005 respectively through the contact portions.

As the substrate 1000, a glass substrate, a quartz substrate, a metal substrate (such as a stainless steel substrate), or a ceramic substrate can be used. Alternatively, a substrate formed of polyethylene terephthalate (PET), polyethylene naphthalate (PEN), polyether sulfone (PES), acrylic, or the like can be used as a plastic substrate.

The insulating layers 1002, 1006, 1007, and 1009 can each be formed to have a single-layer structure or a stacked-layer structure using one or a plurality of the following: silicon oxide, silicon nitride, silicon oxynitride ($SiO_xN_y$) (x>y>0), and silicon nitride oxide ($SiN_xO_y$) (x>y>0), by a CVD method, a sputtering method, or the like.

As the semiconductor layer 1003, amorphous silicon, polycrystalline silicon, or microcrystalline (also referred to as microcrystal or semi-amorphous) silicon can be used. Further, the semiconductor layer 1003 can be formed by a sputtering method, an LPCVD method, a plasma CVD method, or the like.

The semiconductor layer 1003 is crystallized by being irradiated with a laser beam. Note that the semiconductor layer 1003 may be crystallized by a method in which irradiation with a laser beam is combined with a thermal crystallization method using an RTA or an annealing furnace, or a thermal crystallization method using a metal element for promoting crystallization, or the like. After that, an obtained crystalline semiconductor film is etched to have a desired shape so that the semiconductor layer 1003 is formed.

As a laser oscillator used for crystallization, a continuous wave laser (a CW laser) or a pulsed wave laser (a pulsed laser) can be used. As a laser beam which can be used here, a laser beam emitted from one or more of the following can be used: a gas laser such as an Ar laser, a Kr laser, or an excimer laser; a laser of which medium is single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$, added with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. It is possible to obtain crystals with a large grain size when fundamental waves of such laser beams or second to fourth harmonics of the fundamental waves are used. For example, the second harmonic (532 nm) or the third harmonic (355 nm) of an Nd:$YVO_4$ laser (fundamental wave of 1064 nm) can be used. In this case, a power density of approximately 0.01 to 100 $MW/cm^2$ (preferably, 0.1 to 10 $MW/cm^2$) is necessary. Irradiation is conducted at a scanning rate of approximately 10 to 2000 cm/sec. It is to be noted that, a laser using, as a medium, single crystalline YAG, $YVO_4$, forsterite ($Mg_2SiO_4$), $YAlO_3$, or $GdVO_4$, or polycrystalline (ceramic) YAG $Y_2O_3$, $YVO_4$, $YAlO_3$, or $GdVO_4$ added with one or more of Nd, Yb, Cr, Ti, Ho, Er, Tm, and Ta as a dopant; an Ar ion laser; or a Ti:sapphire laser can be continuously oscillated. Furthermore, pulse oscillation thereof can be performed at a repetition rate of 10 MHz or more by carrying out mode locking or the like. In a case where a laser beam is oscillated at a repetition rate of equal to or higher than 10 MHz, after a semiconductor film is melted by a laser and before it is solidified, the semiconductor film is irradiated with a next pulse. Therefore, unlike a case of using a pulsed laser with a low repetition rate, a solid-liquid interface can be continuously moved in the semiconductor film, so that crystal grains which continuously grow in a scanning direction can be obtained.

The first gate electrode 1001 and the second gate electrode 1002 are each formed using an element selected from tantalum (Ta), tungsten (W), titanium (Ti), molybdenum (Mo), aluminum (Al), copper (Cu), chromium (Cr), niobium (Nb), and the like, or an alloy material or a compound material containing any of the above elements as its main component. Alternatively, each of them may be formed using a semiconductor material typified by polycrystalline silicon doped with an impurity element such as phosphorus. Alternatively, each of them may be formed to have a stacked-layer structure using one or a plurality of the above materials. As examples of a combination of the above materials, a tantalum nitride film and a tungsten film, a tungsten nitride film and a tungsten film, and a molybdenum nitride film and a molybdenum film can be given. Since tungsten and tantalum nitride have high heat resistance, heat treatment for thermal activation can be performed after the first gate electrode and the second gate electrode are formed. Alternatively, each of them may have a multilayer structure including three or more layers instead of a two-layer structure. In addition, in a case of a three-layer structure, a stacked-layer structure of a molybdenum film, an aluminum film, and a molybdenum film is preferably adopted.

The impurity region 1004 and the impurity region 1005 can be formed by adding an impurity element to part of the semiconductor layer 1003. Note that in a case where an impurity element needs to be added to a desired region, a resist is additionally formed and the impurity element is added using the resist as a mask, so that the impurity region 1004 and the impurity region 1005 each of which includes a desired element in the desired region can be formed.

The fourth insulating layer 1009 can be formed to have a single-layer structure or a stacked-layer structure using one or a plurality of the following: an inorganic material such as an oxide of silicon or a nitride of silicon, an organic material such as polyimide, polyamide, benzocyclobutene, acrylic, or epoxy, a siloxane material, and the like, by a CVD method, a sputtering method, an SOG method, a droplet discharging method, a screen printing method, or the like.

Each of the wiring 1010 and the wiring 1011 functions as a source wiring or a drain wiring. Each of them is formed using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing any of the above elements as its main component. An alloy material containing aluminum as its main component corresponds to a material which contains aluminum as its main component and also contains nickel, or an alloy material which contains aluminum as its main component and also contains nickel and either or both of carbon and silicon, for example. The wiring 1010 and the wiring 1011 may employ, for example, a stacked-layer structure of a barrier film, an aluminum-silicon (Al—Si) film, and a barrier film, or a stacked-layer structure of a barrier film, an aluminum-silicon (Al—Si) film, a titanium nitride film, and a barrier film. It is to be noted that a barrier film corresponds to a thin film formed using titanium, a nitride of titanium, molybdenum, or a nitride of molybdenum. Aluminum and aluminum silicon which have low resistance and are inexpensive are optimal materials for forming the wiring 1010 and the wiring 1011. In addition, generation of a hillock of aluminum or aluminum silicon can be prevented when upper and lower barrier layers are formed. Furthermore, when the barrier film is formed using titanium that is a highly-reducible element, even if a thin natural oxide film is formed over the crystalline semiconductor film, the natural oxide film can be reduced so that preferable contact with the crystalline semiconductor film can be obtained.

The impurity region 1004 and the wiring 1010 or the impurity region 1005 and the wiring 1011 function as a source terminal or a drain terminal. The channel formation region is formed between the impurity region 1004 and the impurity region 1005.

The first gate electrode 1001 functions as a substrate terminal (also referred to as a control terminal). The first gate electrode 1001 is connected to the substrate voltage generation circuit 105 of Embodiment Mode 1, a voltage inputted from the substrate voltage generation circuit 105 is applied to the channel formation region as a substrate voltage, and thus the threshold voltage of the transistor can be changed.

As described above, the transistor including the substrate terminal is mounted on the rectifier circuit so that the independent substrate voltage can be controlled, and the substrate voltage is controlled so that a rectification operation can be performed with the threshold voltage of the transistor controlled. Further, the rectifier circuit is mounted on a semiconductor device so that an excess voltage can be prevented from being applied to an input circuit even in the case where a high frequency signal strong enough to break an element is supplied to a chip in a semiconductor device which can communicate within a given communication distance. Therefore, a semiconductor device in which an element included in the internal circuit is not deteriorated or broken and thus the other circuits can also normally operate can be provided.

Note that this embodiment mode can be combined with any of the other embodiment modes as appropriate.

Embodiment Mode 8

In this embodiment mode, a transistor including a single crystal semiconductor film is described as an example of a transistor which can be used in the rectifier circuit in the present invention.

Figure 14:
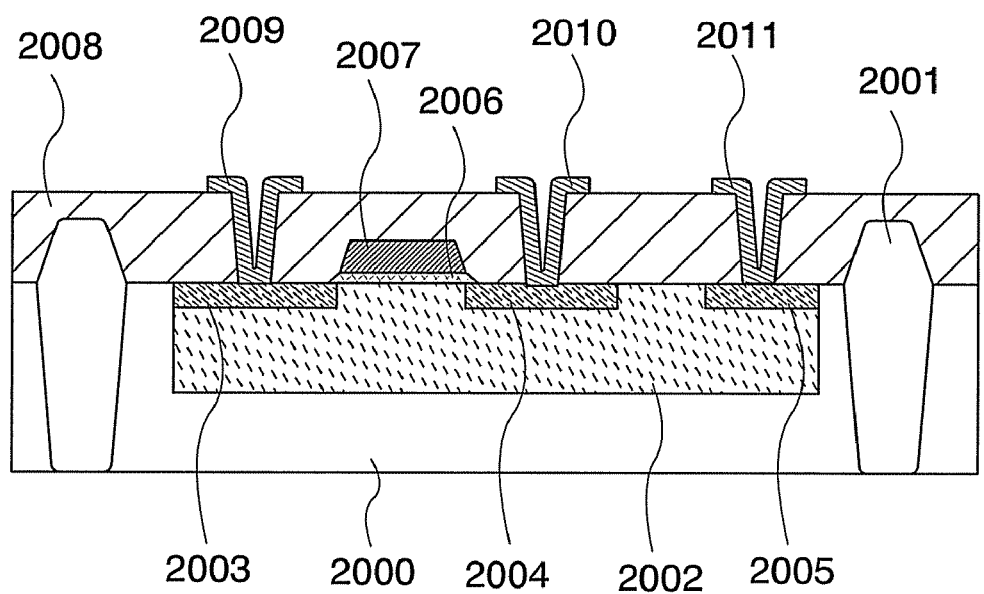
FIG. 14 is a cross-sectional view showing a transistor, which can be used for a rectifier circuit mounted on a semiconductor device of the present invention, in Embodiment Mode 8.
Figure 15A:
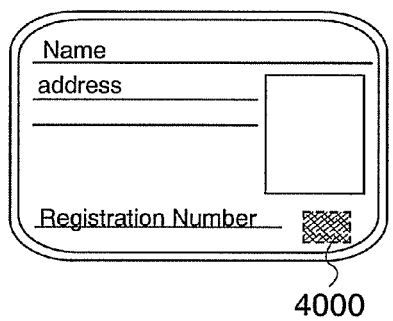
FIGS. 15A to 15F are diagrams showing application examples of a semiconductor device of the present invention, in Embodiment Mode 9.
Figure 15B:
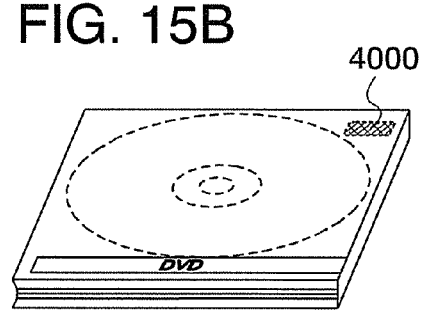
Figure 15C:
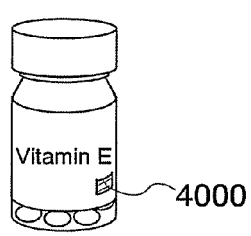
Figure 15D:
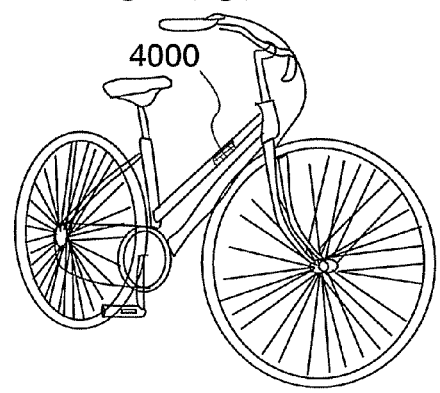
Figure 15E:
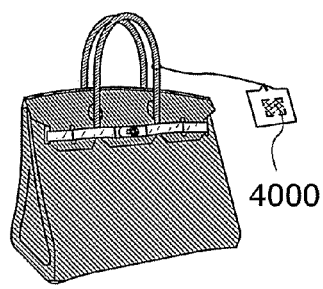
Figure 15F:
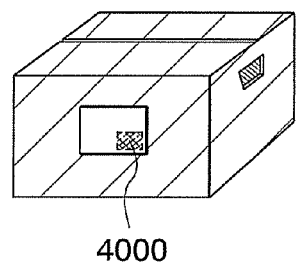

The transistor of this embodiment mode is shown in FIG. 14. The transistor of this embodiment mode includes a first insulating layer 2001 and a second insulating layer 2006 over a substrate 2000; and a gate electrode 2007 over the second insulating layer 2006. A well region 2002 is included in part of the substrate 2000, and further impurity regions 2003, 2004, and 2005 are included in part of the well region 2002. The second insulating layer 2006 and the gate electrode 2007 are provided over a region between the impurity regions 2003 and 2004 of the substrate 2000. The transistor of this embodiment mode further includes a third insulating layer 2008 over the gate electrode 2007 and the substrate 2000; a given number of contact portions in part of the third insulating layer 2008; and a wiring 2009, a wiring 2010, and a wiring 2011 which are provided over the impurity region 2003, the impurity region 2004, and the impurity region 2005 respectively through the contact portions.

As the substrate 2000, an n-type or p-type single crystalline silicon substrate, a compound semiconductor substrate (a GaAs substrate, an InP substrate, a GaN substrate, a SiC substrate, a sapphire substrate, a ZnSe substrate, or the like), an SOI (silicon on insulator) substrate manufactured by a bonding method or a SIMOX (separation by implanted oxygen) method, or the like can be used.

For formation of the first insulating layer 2001, a selective oxidation method (LOCOS (local oxidation of silicon) method), a trench isolation method, or the like can be used.

The gate electrode 2007 can be formed of tantalum, tungsten, titanium, molybdenum, aluminum, copper, chromium, niobium, or the like, a film formed of an alloy containing any of the above metals as its main component, or a film formed of a compound containing any of the above metals. Alternatively, a semiconductor film such as a polycrystalline silicon film doped with an impurity element imparting conductivity, such as phosphorus, may be used. Further, the gate electrode 2007 can be formed by being processed (patterned) into a predetermined shape.

By adding an impurity element, the well region 2002 and the impurity regions 2003, 2004, and 2005 can be formed. As the impurity element, an impurity element imparting n-type conductivity or an impurity element imparting p-type conductivity is used. As the impurity element imparting n-type conductivity, phosphorus, arsenic, or the like can be used. As the impurity element imparting p-type conductivity, boron, aluminum, gallium, or the like can be used. In a case where an impurity element needs to be added to a desired region, a resist is additionally formed and the impurity element is added using the resist as a mask, so that the well region 2002 and the impurity regions 2003, 2004, and 2005 each of which includes a desired element in the desired region can be formed.

Each of the second insulating layer 2006 and the third insulating layer 2008 can be formed using an inorganic material, an organic material, or a mixed material of an organic material and an inorganic material. For example, a film containing silicon oxide, silicon oxynitride, silicon nitride oxide, or carbon typified by DLC (diamond like carbon), acrylic, epoxy, polyimide, polyamide, polyvinylphenol, benzocyclobutene, or the like can be used. In addition, the second insulating layer 2006 and the third insulating layer 2008 can be formed by a CVD method, a sputtering method, a droplet discharging method, or a printing method depending on a material thereof.

The impurity region 2003 and the wiring 2009 or the impurity region 2004 and the wiring 2010 function as a source terminal or a drain terminal. A channel formation region is formed between the impurity region 2003 and the impurity region 2004.

The impurity region 2005 functions as a substrate terminal (also referred to as a control terminal) to which a voltage (also referred to as a substrate voltage), which is independent from a voltage applied to any other terminal of the transistor, is applied. Therefore, the wiring 2011 is connected to the substrate voltage generation circuit 105 in FIG. 1, which is described in Embodiment Mode 1, and thus a voltage inputted through the substrate terminal is applied to the channel formation region as the substrate voltage, so that the threshold voltage of the transistor can be controlled.

As described above, by mounting the transistor including the substrate terminal on the rectifier circuit, the independent substrate voltage can be controlled, and by controlling the substrate voltage, a rectification operation can be performed with the threshold voltage of the transistor controlled. Further, the rectifier circuit is mounted on a semiconductor device so that an excess voltage is not applied to an input circuit even in the case where a high frequency signal strong enough to break an element is supplied to a chip in a semiconductor device which can communicate within a given communication distance. Therefore, a semiconductor device in which an element included in the internal circuit is not deteriorated or broken and thus the other circuits can also normally operate can be provided.

Note that this embodiment mode can be combined with any of the other embodiment modes as appropriate.

Embodiment Mode 9

In this embodiment mode, application examples of the semiconductor device including a rectifier circuit of any of the above embodiment modes will be described.

Application examples of the semiconductor device including a rectifier circuit of any of the above embodiment modes are described with reference to FIGS. 15A to 15F. The semiconductor device is widely used by being provided in, for example, bills, coins, securities, bearer bonds, documents (such as driver's licenses or resident's cards, see FIG. 15A), packaging containers (such as wrapping paper or bottles, see FIG. 15C), storage media (such as DVD software or video tapes, see FIG. 15B), vehicles (such as bicycles, see FIG. 15D), personal belongings (such as bags or glasses), foods, plants, animals, human bodies, clothing, everyday articles, products such as electronic appliances (liquid crystal display devices, EL display devices, television sets, or mobile phones), or tags on products (see FIGS. 15E and 15F), or the like.

A semiconductor device 4000 of the present invention is fixed on products by, for example, being mounted on a printed wiring board, being attached to a surface thereof, or being embedded therein. For example, the semiconductor device 4000 can be embedded in paper of a book, or embedded in an organic resin of a package. Since the semiconductor device 4000 of the present invention can be reduced in size, thickness, and weight, it can be fixed on products without spoiling the design thereof. Further, bills, coins, securities, bearer bonds, documents, or the like can have identification functions by being provided with the semiconductor device 4000 of the present invention, and the identification functions can be utilized to prevent counterfeits. Further, the efficiency of a system such as an inspection system can be improved by providing the semiconductor device of the present invention in, for example, packaging containers, storage media, personal belongings, foods, clothing, everyday articles, or electronic appliances. Even vehicles can have higher security against theft or the like by being provided with the semiconductor devices of the present invention.

As described above, by using the semiconductor device including a rectifier circuit of the present invention for each of the uses described in this embodiment mode, an element in a circuit can stably operate without being deteriorated or broken even in the case where the communication distance of the semiconductor device which can communicate within a given communication distance is changed and thus a high frequency signal with strong enough to break an element is supplied to the circuit. Therefore, reliability of identification functions or security of products can be improved.

This application is based on Japanese Patent Application serial no. 2007-097991 filed with Japan Patent Office on Apr. 4, 2007, the entire contents of which are hereby incorporated by reference.

What is claimed is:

1. A semiconductor device comprising:
    a rectifier circuit comprising a first transistor and a first capacitor,
    a comparing circuit, and
    a voltage generation circuit,
    wherein:
    a first input terminal of the rectifier circuit is electrically connected to a first input terminal of the voltage generation circuit,
    a second input terminal of the rectifier circuit is electrically connected to an output terminal of the voltage generation circuit,
    an output terminal of the rectifier circuit is electrically connected to a first input terminal of the comparing circuit,
    an output terminal of the comparing circuit is electrically connected to a second input terminal of the voltage generation circuit,
    the first input terminal of the rectifier circuit is electrically connected to a first terminal of the first capacitor,
    the second input terminal of the rectifier circuit is electrically connected to a second gate of the first transistor,
    the output terminal of the rectifier circuit is electrically connected to a second terminal of the first transistor,
    a second terminal of the first capacitor is electrically connected to a first terminal of the first transistor and a first gate of the first transistor,
    the comparing circuit is configured to output a first signal to the output terminal of the comparing circuit determined by comparing a first voltage of the first input terminal of the comparing circuit with a reference voltage of a second input terminal of the comparing circuit,
    the voltage generation circuit is configured to output a second voltage to the output terminal of the voltage generation circuit in accordance with the first signal, and
    a threshold voltage of the first transistor is controllable by the second voltage.

2. The semiconductor device according to claim 1, further comprising a bias circuit configured to generate the reference voltage and to output the reference voltage to the comparing circuit.

3. The semiconductor device according to claim 1, further comprising
    a bias circuit configured to generate the reference voltage from the first voltage.

4. The semiconductor device according to claim 1, wherein the rectifier circuit is configured to change the first voltage when the threshold voltage of the first transistor is changed by the second voltage.

5. The semiconductor device according to claim 1, further comprising an antenna electrically connected to the first input terminal of the rectifier circuit.

6. The semiconductor device according to claim 1,
    wherein the voltage generation circuit comprises a switch, a second transistor, and a second capacitor, wherein the first input terminal of the voltage generation circuit is electrically connected to a first terminal of the switch, wherein the second input terminal of the voltage generation circuit is electrically connected to a control terminal of the switch, wherein the output terminal of the voltage generation circuit is electrically connected to a first terminal of the second transistor and a gate of the second transistor, and wherein a second terminal of the second capacitor is electrically connected to a second terminal of the second transistor.

7. The semiconductor device according to claim 1, wherein the rectifier circuit comprises a second transistor and a second capacitor, wherein the second input terminal of the rectifier circuit is electrically connected to a second gate of the second transistor, wherein a third input terminal of the rectifier circuit is electrically connected to a first terminal of the second transistor, a first gate of the second transistor, and a first terminal of the second capacitor, wherein the output terminal of the rectifier circuit is electrically connected to a second terminal of the second capacitor, and wherein a second terminal of the second transistor is electrically connected to the first terminal of the first transistor.

8. A semiconductor device comprising:

a rectifier circuit comprising a first transistor and a first capacitor, a comparing circuit, and a voltage generation circuit, wherein:

a first input terminal of the rectifier circuit is electrically connected to a first input terminal of the voltage generation circuit, a second input terminal of the rectifier circuit is electrically connected to an output terminal of the voltage generation circuit, an output terminal of the rectifier circuit is electrically connected to a first input terminal of the comparing circuit, an output terminal of the comparing circuit is electrically connected to a second input terminal of the voltage generation circuit, the first input terminal of the rectifier circuit is electrically connected to a first terminal of the first capacitor, the second input terminal of the rectifier circuit is electrically connected to a second gate of the first transistor, the output terminal of the rectifier circuit is electrically connected to a second terminal of the first transistor, a second terminal of the first capacitor is electrically connected to a first terminal of the first transistor and a first gate of the first transistor, the first transistor comprises a semiconductor layer between the first gate of the first transistor and the second gate of the first transistor, the comparing circuit is configured to output a first signal to the output terminal of the comparing circuit determined by comparing a first voltage of the first input terminal of the comparing circuit with a reference voltage of a second input terminal of the comparing circuit, the voltage generation circuit is configured to output a second voltage to the output terminal of the voltage generation circuit in accordance with the first signal, and a threshold voltage of the first transistor is controllable by the second voltage.

9. The semiconductor device according to claim 8, further comprising a bias circuit configured to generate the reference voltage and to output the reference voltage to the comparing circuit.

10. The semiconductor device according to claim 8, further comprising a bias circuit configured to generate the reference voltage from the first voltage.

11. The semiconductor device according to claim 8, wherein the rectifier circuit is configured to change the first voltage when the threshold voltage of the first transistor is changed by the second voltage.

12. The semiconductor device according to claim 8, further comprising an antenna electrically connected to the first input terminal of the rectifier circuit.

13. The semiconductor device according to claim 8, wherein the voltage generation circuit comprises a switch, a second transistor, and a second capacitor, wherein the first input terminal of the voltage generation circuit is electrically connected to a first terminal of the switch, wherein the second input terminal of the voltage generation circuit is electrically connected to a control terminal of the switch, wherein the output terminal of the voltage generation circuit is electrically connected to a first terminal of the second transistor and a gate of the second transistor, and wherein a second terminal of the second capacitor is electrically connected to a second terminal of the second transistor.

14. The semiconductor device according to claim 8, wherein the rectifier circuit comprises a second transistor and a second capacitor, wherein the second input terminal of the rectifier circuit is electrically connected to a second gate of the second transistor, wherein a third input terminal of the rectifier circuit is electrically connected to a first terminal of the second transistor, a first gate of the second transistor, and a first terminal of the second capacitor, wherein the output terminal of the rectifier circuit is electrically connected to a second terminal of the second capacitor, and wherein a second terminal of the second transistor is electrically connected to the first terminal of the first transistor.

15. A semiconductor device comprising:

a rectifier circuit comprising a first transistor and a first capacitor, a comparing circuit, and a voltage generation circuit, wherein:

a first input terminal of the rectifier circuit is electrically connected to a first input terminal of the voltage generation circuit, a second input terminal of the rectifier circuit is electrically connected to an output terminal of the voltage generation circuit, an output terminal of the rectifier circuit is electrically connected to a first input terminal of the comparing circuit, an output terminal of the comparing circuit is electrically connected to a second input terminal of the voltage generation circuit, the first input terminal of the rectifier circuit is electrically connected to a first terminal of the first capacitor, the second input terminal of the rectifier circuit is electrically connected to a second gate of the first transistor, the output terminal of the rectifier circuit is electrically connected to a second terminal of the first transistor, a second terminal of the first capacitor is electrically connected to a first terminal of the first transistor and a first gate of the first transistor, the first transistor comprises a single crystal semiconductor layer between the first gate of the first transistor and the second gate of the first transistor, the comparing circuit is configured to output a first signal to the output terminal of the comparing circuit determined by comparing a first voltage of the first input terminal of the comparing circuit with a reference voltage of a second input terminal of the comparing circuit, the voltage generation circuit is configured to output a second voltage to the output terminal of the voltage generation circuit in accordance with the first signal, and a threshold voltage of the first transistor is controllable by the second voltage.

16. The semiconductor device according to claim 15, further comprising a bias circuit configured to generate the reference voltage and to output the reference voltage to the comparing circuit.

17. The semiconductor device according to claim 15, further comprising a bias circuit configured to generate the reference voltage from the first voltage.

18. The semiconductor device according to claim 15, wherein the rectifier circuit is configured to change the first voltage when the threshold voltage of the first transistor is changed by the second voltage.

19. The semiconductor device according to claim 15, further comprising an antenna electrically connected to the first input terminal of the rectifier circuit.

20. The semiconductor device according to claim 15, wherein the voltage generation circuit comprises a switch, a second transistor, and a second capacitor, wherein the first input terminal of the voltage generation circuit is electrically connected to a first terminal of the switch, wherein the second input terminal of the voltage generation circuit is electrically connected to a control terminal of the switch, wherein the output terminal of the voltage generation circuit is electrically connected to a first terminal of the second transistor and a gate of the second transistor, and wherein a second terminal of the second capacitor is electrically connected to a second terminal of the second transistor.

21. The semiconductor device according to claim 15, wherein the rectifier circuit comprises a second transistor and a second capacitor, wherein the second input terminal of the rectifier circuit is electrically connected to a second gate of the second transistor, wherein a third input terminal of the rectifier circuit is electrically connected to a first terminal of the second transistor, a first gate of the second transistor, and a first terminal of the second capacitor, wherein the output terminal of the rectifier circuit is electrically connected to a second terminal of the second capacitor, and wherein a second terminal of the second transistor is electrically connected to the first terminal of the first transistor.

\* \* \* \* \*